US012718785B2

(12) United States Patent
Vorobyev et al.

(10) Patent No.: US 12,718,785 B2
(45) Date of Patent: Aug. 25, 2026

(54) SYSTEM, METHOD, AND NON-TRANSITORY COMPUTER-READABLE STORAGE MEDIUM FOR COLLABORATING ON A MUSICAL COMPOSITION OVER A COMMUNICATION NETWORK

(71) Applicant: MIXED IN KEY LLC, Miami, FL (US)

(72) Inventors: Yakov Vorobyev, Miami, FL (US); Fabian Hernandez, Miami, FL (US); Isaac Sprintis, Fort Lauderdale, FL (US)

(73) Assignee: MIXED IN KEY LLC, Miami, FL (US)

( * ) Notice: Subject to any disclaimer, the term of this patent is extended or adjusted under 35 U.S.C. 154(b) by 418 days.

(21) Appl. No.: 18/365,121

(22) Filed: Aug. 3, 2023

(65) Prior Publication Data

US 2024/0212655 A1 Jun. 27, 2024

Related U.S. Application Data

(63) Continuation of application No. 17/403,503, filed on Aug. 16, 2021, now Pat. No. 11,721,312, which is a (Continued)

(51) Int. Cl.
*G10H 1/00* (2006.01)

(52) U.S. Cl.
CPC ......... *G10H 1/0008* (2013.01); *G10H 1/0058* (2013.01); *G10H 2210/105* (2013.01); *G10H 2240/171* (2013.01); *G10H 2240/325* (2013.01)

(58) Field of Classification Search
CPC ............... G10H 1/0008; G10H 1/0058; G10H 2210/105; G10H 2240/171; G10H 2240/325

(Continued)

(56) References Cited

U.S. PATENT DOCUMENTS 7,518,051 B2 * 4/2009 Redmann ............. G10H 1/0058 84/601
8,487,173 B2 * 7/2013 Emmerson ........... G10H 1/0025 84/602

(Continued)

FOREIGN PATENT DOCUMENTS

CN 112118062 A * 12/2020 ......... G10L 21/0208
EP 3930251 A1 * 12/2021 ............. H04H 60/04

(Continued)

OTHER PUBLICATIONS

International Search Report issued in corresponding Application No. PCT/US20/58710 on Feb. 19, 2021, 12 pages.

(Continued)

*Primary Examiner* — Christina M Schreiber
(74) *Attorney, Agent, or Firm* — Oblon, McClelland, Maier & Neustadt, L.L.P.

(57) ABSTRACT

A system and methods for collaborating on a musical composition over a communication network, the system having processing circuitry that obtains the musical composition stored within a data storage device of the system, the musical composition including a first musical input data associated with a first channel, receives, via the communication network, second musical input data from a client device, the second musical input data being associated with a second channel, generates a data block based on the received second musical input data, the generated data block including synchronization data associated with the second musical input data relative to at least a portion of the musical composition, and transmits the data block to memory, the memory being accessible via the communication network to the client device and other client devices that are collaborating on the musical composition.

20 Claims, 15 Drawing Sheets

Related U.S. Application Data continuation of application No. 17/086,102, filed on Oct. 30, 2020, now Pat. No. 11,120,782.

(60) Provisional application No. 63/012,681, filed on Apr. 20, 2020.

(58) Field of Classification Search
USPC ............................................................ 84/601
See application file for complete search history.

(56) References Cited

U.S. PATENT DOCUMENTS

| | | | | |
|---|---|---|---|---|
| 8,525,013 | B2 * | 9/2013 | Bicker | H04N 7/15 84/645 |
| 8,779,265 | B1 * | 7/2014 | Gottlieb | G10H 1/0033 84/645 |
| 9,779,708 | B2 * | 10/2017 | Gottlieb | G06F 3/165 |
| 11,120,782 | B1 * | 9/2021 | Vorobyev | G10H 1/0008 |
| 11,721,312 | B2 * | 8/2023 | Vorobyev | G10H 1/0008 84/601 |
| 2003/0121401 | A1 * | 7/2003 | Ito | G10H 1/0083 84/625 |
| 2003/0164084 | A1 * | 9/2003 | Redmann | G10H 1/0058 84/615 |
| 2006/0283310 | A1 * | 12/2006 | Bicker | H04L 65/762 84/645 |
| 2007/0039449 | A1 * | 2/2007 | Redmann | G10H 1/0058 84/609 |
| 2007/0150539 | A1 * | 6/2007 | O'Sullivan | G10H 1/0083 709/204 |
| 2009/0161585 | A1 * | 6/2009 | Bicker | H04L 65/762 370/352 |
| 2009/0172200 | A1 * | 7/2009 | Morrison | G10H 1/0058 709/248 |
| 2010/0198992 | A1 * | 8/2010 | Morrison | G10H 1/0058 709/248 |
| 2013/0314492 | A1 * | 11/2013 | Bicker | H04L 65/4038 348/14.08 |
| 2015/0058017 | A1 * | 2/2015 | Singh | G06F 21/6218 704/249 |
| 2016/0358595 | A1 * | 12/2016 | Sung | G11B 27/34 |
| 2017/0127145 | A1 * | 5/2017 | Rajapakse | H04R 29/006 |
| 2017/0287457 | A1 * | 10/2017 | Vorobyev | G10H 1/0033 |
| 2018/0374462 | A1 * | 12/2018 | Steinwedel | G06T 11/00 |
| 2019/0066643 | A1 * | 2/2019 | Packouz | G06F 3/165 |
| 2019/0306540 | A1 * | 10/2019 | Holmberg | H04N 21/632 |
| 2020/0058279 | A1 * | 2/2020 | Garrison | G10H 1/0066 |
| 2020/0186575 | A1 * | 6/2020 | Rofe | H04L 65/765 |
| 2020/0227013 | A1 * | 7/2020 | Elson | G10H 1/0033 |
| 2022/0108674 | A1 * | 4/2022 | Vorobyev | G10H 1/0008 |
| 2022/0122573 | A1 * | 4/2022 | Steinwedel | G10H 1/368 |
| 2024/0212655 | A1 * | 6/2024 | Vorobyev | G10H 1/0058 |

FOREIGN PATENT DOCUMENTS

| | | | |
|---|---|---|---|
| WO | WO 2019/038019 | 2/2019 | |
| WO | WO-2019038019 A1 * | 2/2019 | H04L 65/403 |

OTHER PUBLICATIONS

"The universal bridge between DAWs" Home—BeatConnect. Retrieved from https://www.beatconnect.com., Accessed Mar. 23, 2021.

BeatConnect. "Incoming: BeatConnect 2.0 is ready for testing! Don't miss this; become a tester today: https://beatconnect.ca" *Facebook*. Dec. 9, 2020., https://www.facebook.com/JoinBeatConnect. Accessed Mar. 24, 2021.

BeatConnect . "We're proud to announce the launch of BeatConnect, the world's first realtime collaborative platform for musicians and producers alike . . . early access phase: https://beatconnect.cal" Facebook. Aug. 7, 2020., https://www.facebook.com/JoinBeatConnect. Accessed Mar. 24, 2021.

"BeatConnectOfficial" *Reddit Forum*. https://www.reddit.com/r/BeatConnectOfficial/., Accessed Mar. 24, 2021.

* cited by examiner

870

SYSTEM, METHOD, AND NON-TRANSITORY COMPUTER-READABLE STORAGE MEDIUM FOR COLLABORATING ON A MUSICAL COMPOSITION OVER A COMMUNICATION NETWORK

CROSS-REFERENCE TO RELATED APPLICATIONS

This application is a continuation of U.S. application Ser. No. 17/403,503, filed Aug. 16, 2021, which is a continuation of U.S. application Ser. No. 17/086,102, filed Oct. 30, 2020, now U.S. Pat. No. 11,120,782, which claims priority under 35 U.S.C. § 119(e) from U.S. Provisional Patent Application No. 63/012,681 entitled "Collaboration Across Multiple Digital Audio Workstations," filed Apr. 20, 2020, the entire disclosure of each of these applications is incorporated herein by reference.

BACKGROUND

This disclosure is directed to collaboration techniques by which musicians can collaborate on a musical composition by electronic means over a communication network.

Online music collaboration is increasingly prevalent and in high demand. However, current methods of online music collaboration do not provide musicians the ability to interact with each other efficiently and, further, do not track changes in musical compositions during musical sessions organized between musicians. In fact, existing technologies do not provide any method to determine a change to a musical piece in a current session based on an earlier session.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a system, apparatus, and method of collaboration across multiple digital audio workstations.

According to an embodiment, the present disclosure further relates to a system for collaborating on a musical composition over a communication network, the system comprising processing circuitry configured to obtain the musical composition stored within a data storage device of the system, the musical composition including a first musical input data associated with a first channel, receive, via the communication network, second musical input data from a client device, the second musical input data being associated with a second channel, generate a data block based on the received second musical input data, the generated data block including synchronization data associated with the second musical input data relative to at least a portion of the musical composition, and transmit the data block to memory, the memory being accessible via the communication network to the client device and other client devices that are collaborating on the musical composition.

According to an embodiment, the present disclosure further relates to a method for collaborating on a musical composition over a communication network, comprising obtaining, by processing circuitry, the musical composition stored within a data storage device, the musical composition including a first musical input data associated with a first channel, receiving, by the processing circuitry and via the communication network, second musical input data from a client device, the second musical input data being associated with a second channel, generating, by the processing circuitry, a data block based on the received second musical input data, the generated data block including synchronization data associated with the second musical input data relative to at least a portion of the musical composition, and transmitting, by the processing circuitry, the data block to memory, the memory being accessible via the communication network to the client device and other client devices that are collaborating on the musical composition.

According to an embodiment, the present disclosure further relates to a non-transitory computer-readable storage medium including computer executable instructions wherein the instructions, when executed by a computer, cause the computer to perform a method for collaborating on a musical composition over a communications network, the method comprising obtaining the musical composition stored within a data storage device, the musical composition including a first musical input data associated with a first channel, receiving, via the communication network, second musical input data from a client device, the second musical input data being associated with a second channel, generating a data block based on the received second musical input data, the generated data block including synchronization data associated with the second musical input data relative to at least a portion of the musical composition, and transmitting the data block to memory, the memory being accessible via the communication network to the client device and other client devices that are collaborating on the musical composition.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
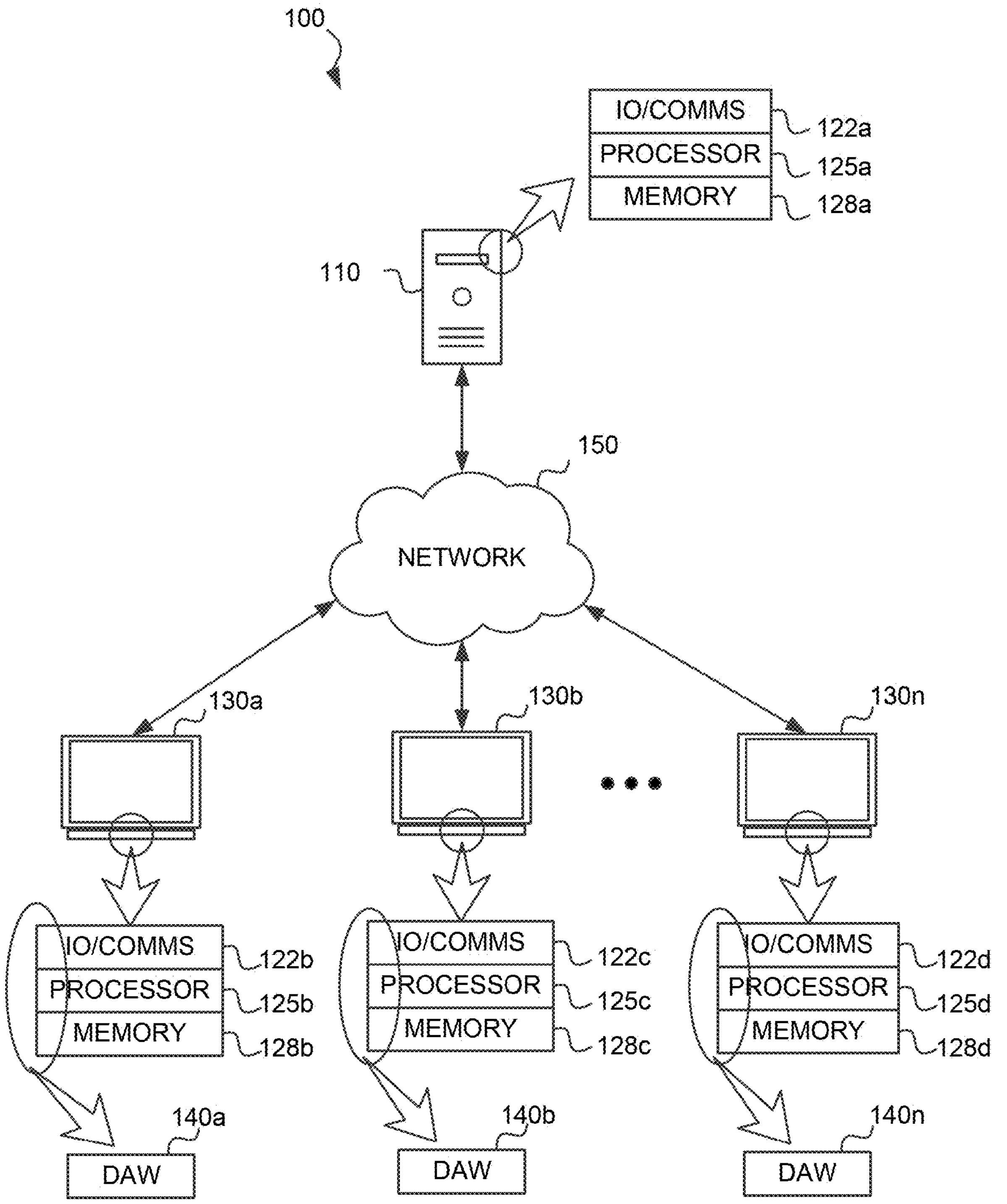
FIG. 1 is a schematic block diagram of a system configuration for collaboration across multiple digital audio workstations, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present concept(s) is/are best described through certain embodiments thereof, which are described in detail herein with reference to the accompanying drawings, wherein like reference numerals refer to like features throughout. It is to be understood that the term disclosure, when used herein, is intended to connote the technological concept underlying the embodiments described below and not merely the embodiments themselves. It is to be understood further that the general technological concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Software may refer to processor instructions that, when executed by processor circuitry, realize the functionality of the embodiments described herein, i.e., musical collaboration between multiple composers. Software may realize such functionality directly into a product, such as a DAW, or may be implemented as a plugin that has its own user interface to supplement the functionality realized in a product, such as a DAW.

Host may refer to a designated user that affects administrative control over a collaboration session by, for example, inviting collaborators, creating an original piece of music to which other collaborators can contribute, selecting which contributions are ultimately included in a final piece of music, etc.

Guest may refer to a collaborating musician that contributes to a musical piece initially created by a host.

Viewing Guest may refer to a musician or lay person that enters the collaboration session with limited permissions, such as only being able to play-back audio.

Session may refer to a period in which multiple hosts and guests interact and collaborate on a common piece of music. Each session may have one or more hosts and zero or more guests.

Session ID may refer to a unique identifier that identifies a particular session in which multiple collaborators are bound.

Application Programming Interface (API) may refer to a software-implemented mechanism by which certain features, including cloud-hosted features of the disclosure, are accessed by multiple hosts/guests for musical collaboration.

Cloud Storage may refer to a memory (or memory circuitry) in which music data files and associated metadata are stored at a central, network-accessible location through an API or directly through a communication network.

Digital Audio Workstation (DAW) may refer to a device comprising a combination of computing hardware and software by which music data files are created, stored, edited and rendered as audible music.

Plugin may refer to a software component that has its own user interface as an auxiliary to interface components that are implemented directly into a product, such as a DAW.

Tempo may refer to the pace of a musical piece, measured in beats per minute.

Key and Scale may refer to a set of allowed pitches in a musical piece, written as, for example, "D Major."

Audio Channel may refer to a mechanism in a DAW by which a specific audio signal flow is distinguished from other such signal flows. For example, a DAW may implement, as an audio channel, a bass channel, a vocal channel, and a kick drum channel, each segregating a particular sound from other sounds.

Stem is an audio channel that has been rendered to a WAV file or a similar audio format.

Pancake may refer to a segment of music data that forms a candidate contribution to a musical piece.

Audio Signal may refer to a digitized waveform that represents audible music information of a particular instrument produced by a DAW that can be further processed by features described herein.

Real time is referred to as a time duration during which users of DAWs utilize a musical instrument or provide vocals into a microphone, in real time, to generate first musical input data or second musical input data during the musical collaboration session.

Musical Instrument Digital Interface (MIDI) Signal may refer to instrument-agnostic music data defining notes of a musical piece.

Encoding may refer to a technique by which an audio signal is compressed into a particular audio file format that may be stored in memory circuitry, such as OGG Vorbis or MP3.

Take may refer to audio data containing all or a portion of a musical piece with which a composer is satisfied. A single take may contain multiple pancakes.

The present disclosure allows multiple musicians working remotely, and with a respective DAW, to collaborate with each other and share music files. This approach provides serval advantages: (1) the sharing of music data avoids external services like email, Dropbox or iCloud in favor of native musical data by which near-real-time synchronization of contributions to a musical piece is achieved, (2) a producer can arrange different parts—a bass player can contribute a bassline idea, a vocalist can sing and record an audio track that becomes the vocal part of the musical composition, and so forth, and (3) it allows musicians to work with their existing software and hardware, including across multiple different DAWs and operating systems. For example, a bass player may use Pro Tools on Microsoft Windows, while the producer may use Logic Pro, or another, different DAW, on Apple OS or other operating system.

Referring now to the Figures, FIG. 1 is a schematic block diagram of an exemplary system 100 by which the present disclosure can be embodied. System 100 may implement a collaborative environment in which musicians can compose music. The system 100 may comprise a plurality of computer workstations 130*a*-130*n*, representatively referred to herein as workstation(s) 130 communicatively coupled to a central server 110. Workstations 130 and server 110 may comprise resources including, but not limited to input-output (IO)/communications components 122*a*-122*d*, representatively referred to herein as IO/communications component(s) 122, processor components 125*a*-125*d*, representatively referred to herein as processor component(s) 125, and memory components 128*a*-128*d*, representatively referred to herein as memory component(s) 128. As illustrated in FIG. 1, resources on workstations 130 may realize digital audio workstations (DAWs) 140*a*-140*n*, representatively referred to herein as DAW(s) 140, by which composers may compose music.

In an embodiment, server 110 may accept data representing music segments and may compare received music segments with previously stored music segments to determine if there are any updates include in the received music segments to identify a new version of the music segment and compile or otherwise integrate the music segments into a single piece of music, as further described below.

Figure 2A:
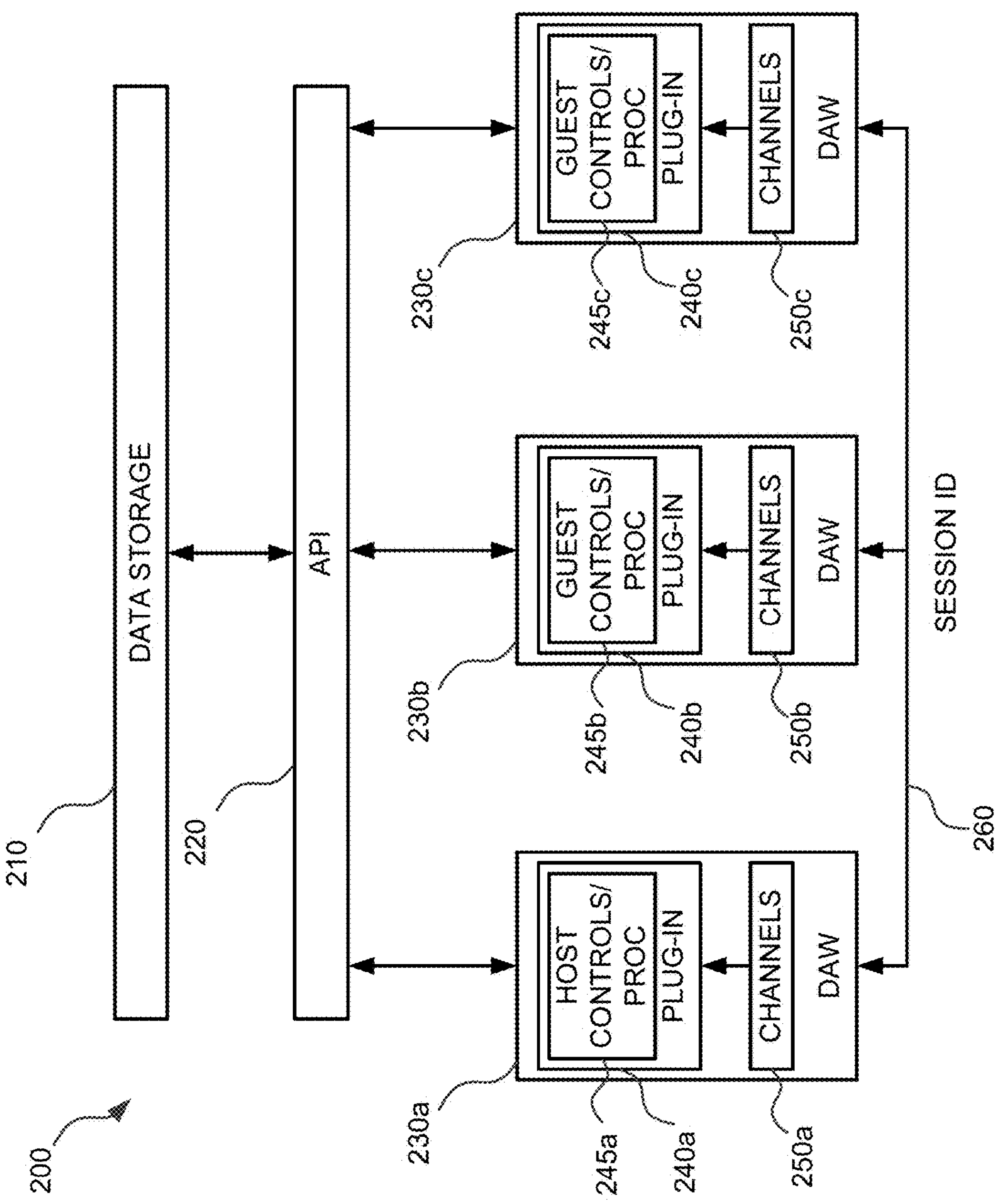
FIG. 2A is a schematic block diagram of a system configuration for collaboration across multiple digital audio workstations, according to an exemplary embodiment of the present disclosure.
Figure 2B:
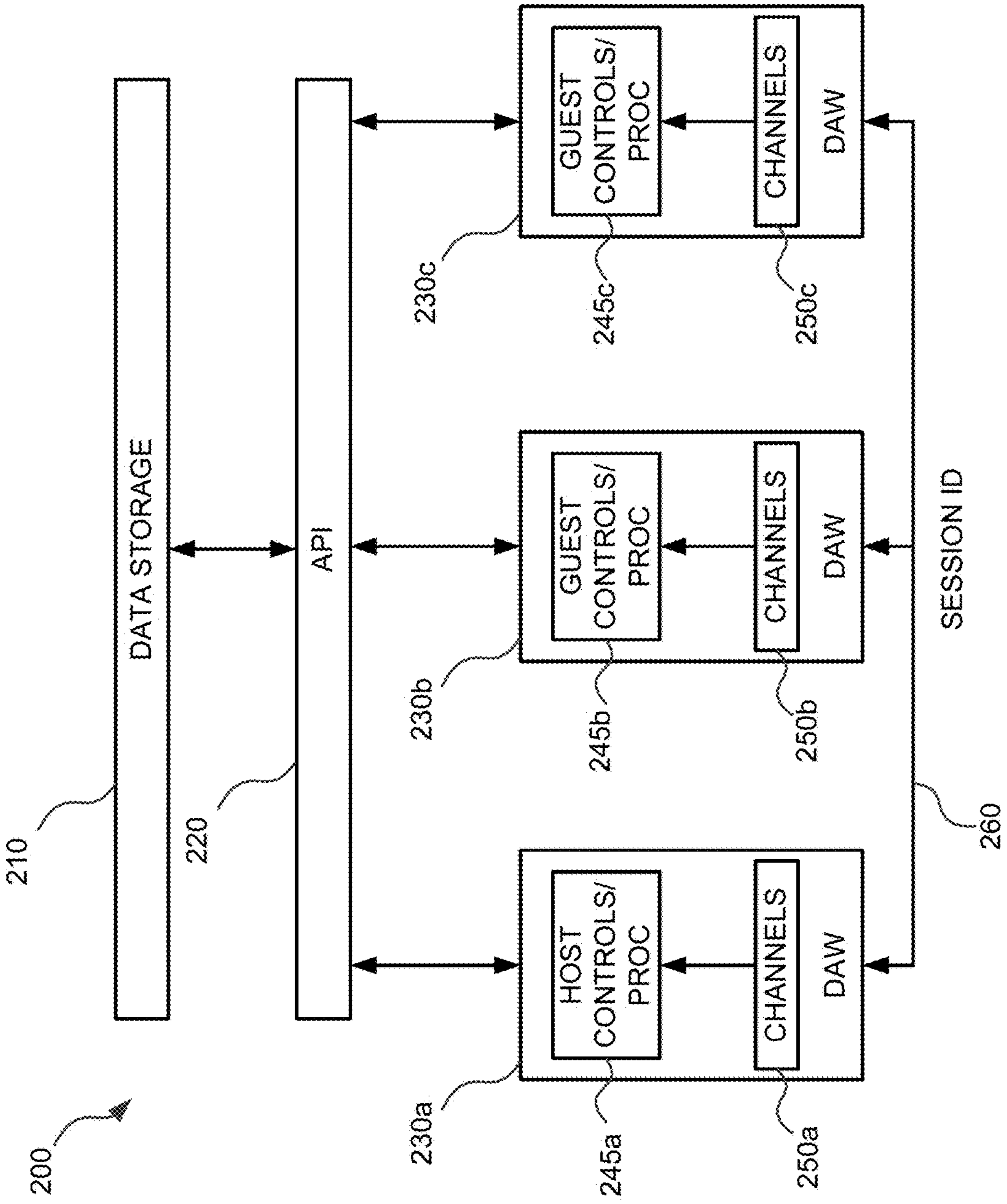
FIG. 2B is a schematic block diagram of a system configuration for collaboration across multiple digital audio workstations, according to an exemplary embodiment of the present disclosure.

FIG. 2A and FIG. 2B provide schematic block diagrams of an exemplary musical collaboration system 200 by which the present disclosure can be embodied. Musical collaboration system 200 represents various software components that may be implemented on the hardware of system 100. For example, DAWs 230*a*-230*c* may be implemented on workstations 130 (as DAWs 140, for example) and application programing interface (API) 220 and data storage 210 may be implemented on server 110. Further, in another embodiment, API 220 and data storage 210 may be implemented at DAWs 230*a*-230*c*. Other configurations are possible, examples of which are described below.

In an embodiment, and as illustrated in FIG. 2A, DAWs 230*a*-230*c* may be a music software application that is integrated with plugins 240*a*-240*c* to initiate or access a musical collaboration session. In another embodiment, DAWs 230*a*-230*c* may be a music software application in which plugins 240*a*-240*n* may be instantiated by a drag-and-drop operation to initiate or access a musical collaboration session. The musical collaboration session may be conducted between DAWs 230*a*-230*c* by API 220 that is hosted at server 110.

In an embodiment, and as illustrated in FIG. 2B, DAWs 230*a*-230*c* may be a music software application that communicates directly with API 220 that is hosted at server 110, thereby obviating plugins 240*a*-240*c*.

In the example of FIG. 2A and FIG. 2B, three (3) DAWs 230*a*-230*c* are outfitted for musical collaboration. It can be appreciated, however, that any number of DAWs may be used in conjunction with the embodiments disclosed herein. DAWs 230*a*-230*c* may employ a set of channels 250*a*-250*c*, which can be audio channels representing sound waveforms produced by specific instruments (including vocals) or MIDI channels representing instrument-agnostic musical note data. Those having skill in the art will recognize how audio and/or MIDI channels can be realized in a DAW without explicit details being set forth herein.

In one embodiment, the set of channels 250*a*-250*c* of the DAWs 230*a*-230*c* may be audio channels, for example, a "bass" channel, a "vocal" channel, a "kick drum" channel, a "guitar" channel, a "piano" channel, a "violin" channel, or "master" channel, although any other type of musical instrumental data may also be included as part of the audio channels.

In this example a "bass" channel is a channel dedicated to bass musical data, similarly a "vocal" channel is a channel dedicated to vocals data, a "kick drum" channel is a channel dedicated to kick drum musical data, a "guitar" channel is a channel dedicated to guitar musical data, a "piano" channel is a channel dedicated to piano musical data, and a "violin" channel is a channel dedicated to violin musical data. Further, a master channel is a channel that includes data from all types of musical parameter channel categories.

In another embodiment, the audio channels including a "bass" channel, a "vocal" channel, a "kick drum" channel, a "guitar" channel, a "piano" channel, a "violin" channel, may be referred to as musical parameter channel categories.

Embodiments may implement several features by which DAWs 230*a*-230*c* intercommunicate in a controlled manner with each other and with API 220 and data storage 210 to enable collaboration of multiple composers on a single musical composition. Such features may be additional to those already implemented in DAWs 230*a*-230*c*, such as through plugins 240*a*-240*c* shown in FIG. 2A. However, the same features may be implemented as functionality of the DAWs 230*a*-230*c* itself, as shown in FIG. 2B, thus obviating the need for a plugin. As it relates to FIG. 2A, the set of features may be the same across all plugins 240*a*-240*c*, functionality of such features being constrained at those DAWs operated by guest composers. For example, functionality of DAWs 230*b*-230*c* may be limited when primary control over the collaboration process is affected at one or more DAWs 230*a*-230*c* operated by a host composer (i.e., DAW 230*a*).

In certain embodiments, the designation of which DAW 230*a*-230*c* is the host and which are guests corresponds to the composer that initiates a collaborative session. In the illustrated embodiments of FIG. 2A and FIG. 2B, the host/guest functionality is indicated at host controls/processor 245*a* and guest controls/processors 245*b*-245*c*.

In an embodiment, the DAWs 230*a*-230*c* may collaborate together over a session to compose music. For example, and in view of FIG. 2A, when a DAW 230*a* is associated with a host user, the host user initiates a collaborative session by accessing a DAW 230*a*-230*c* that is integrated with plugins 240*a*-240*c* to initiate or access a musical collaboration session. Upon accessing the music collaboration application, a user interface is generated that displays a prompt offering one of two options: (1) "Host a session" or (2) "Join an existing session". When the host user selects the (1) "Host a session" prompt, a new collaborative session is initiated between the DAW 230*a* and API 220. Upon initiating the new collaborative session as a host, the DAW 230*a* would now be referred to as a host composer device 230*a*. This new collaborative session is assigned a unique session ID 260 by the API 220. API 220 provides the session ID to the DAW 230*a*. Session ID 260 may take the form of a hyperlink or textual data that can be entered into a suitable text entry box to provide access to the new collaborative session. DAW 230*a* may provide the session ID 260 to other guest users associated with the DAW 230*b*-230*c*. Once session ID 260 has been selected by guest users accessing DAWs 230*b*-230*c*, host DAW 230*a* and guest DAWs 230*b*-230*c* can collaborate on a common musical composition. Upon accessing the new collaborative session by selecting the session ID 260, the DAWs 230*b*-230*c* may be referred to as guest composer devices 230*b*-230*c*.

In an embodiment, DAWs 230*a*-230*c* may be associated, or otherwise bound, together by a session ID 260 which may be generated by API 220 or other ID generating mechanisms upon instantiation of a collaborative session. For example, when host DAW 230*a* instantiates a collaborative session and activates host controls/processor 245*a*, API 220 may generate a session ID 260 which may be provided to other DAWs, such as DAWs 230*b*-230*c*, for purposes of entering into the session. Session ID 260 may take the form of a hyperlink or textual data that can be entered into a suitable text entry control of guest controls/processors 245*b*-245*c*. Once session ID 260 has been selected by guest DAWs 230*b*-230*c*, host DAW 230*a* and guest DAWs 230*b*-230*c* can collaborate on a common musical composition.

During a collaborative session, each user, including the host user associated with the host composer device 230*a* and the guest composer(s), may identify the channels 250*a*-250*c* on which they wish to compose. The contributions produced at host DAW 230*a* and guest DAWs 230*b*-230*c* may be stored in memory circuitry, e.g., data storage 210. In one embodiment, API 220 realizes processor-callable procedures by which such contributions are stored in a cloud storage facility, where, in this case, data storage 210 may implement such storage. As is discussed further below, the stored contribution data, referred to herein as pancake data, may be combined or otherwise assembled into a candidate musical composition that can ultimately become a finalized musical composition. In an embodiment, the finalized musical composition may be determined upon approval of the candidate musical composition by the host composer. The candidate musical composition can be visible to each of the host DAW 230*a* and guest DAWs 230*b*-230*c* in the API 220.

Figure 3:
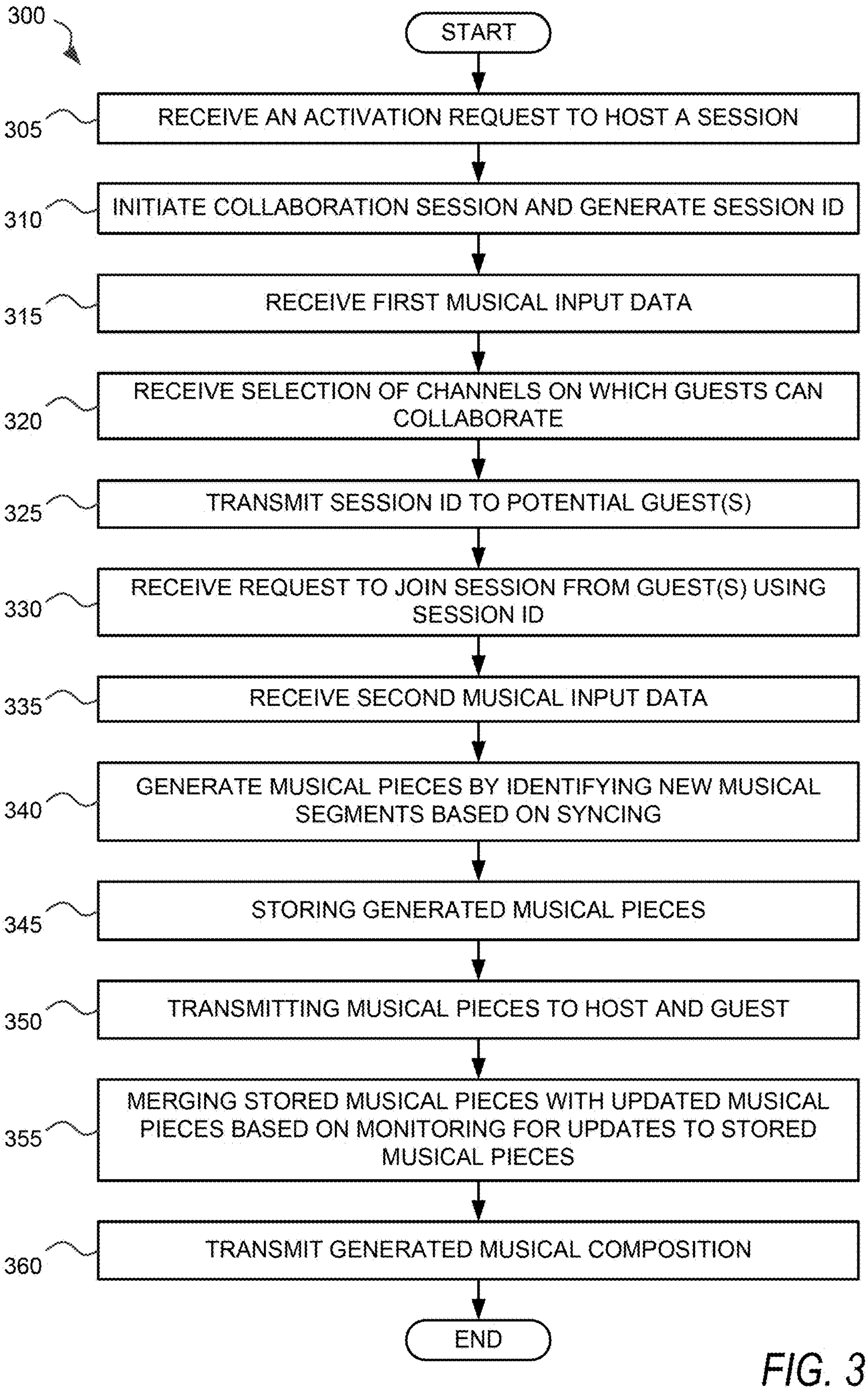
FIG. 3 is a flow diagram describing a of collaboration across multiple digital audio workstations, according to an exemplary embodiment of the present disclosure.

FIG. 3 is a flow diagram of an exemplary collaboration process 300, in view of FIG. 2A, according to an embodiment of the present disclosure. This exemplary collaboration process 300 is implemented by server 110 that is configured to execute functions (software instructions) that perform one or more of the operations of the exemplary collaboration process 300. In an embodiment, server 110 may be a local server or a remote server, as appropriate. Server 110 hosts the API 220 and the API 220 is in communication with DAWs 230*a*-230*c*. Each DAW 230*a*-230*c* communicates instructions to API 220 via a respective plugin 240*a*-240*c*.

As described above, DAWs 230*a*-230*c* may be a music software application that is integrated with plugins 240*a*-240*c* to initiate or access a musical collaboration session. In an embodiment, DAWs 230*a*-230*c* may be a music software application in which plugins 240*a*-240*n* may be instantiated by a drag-and-drop operation to initiate or access a musical collaboration session. The musical collaboration session may be conducted between DAWs 230*a*-230*c* by API 220 that is hosted at server 110. Though a musical collaboration session is described above with reference to server 110 and API 220, it can be appreciated that, in another embodiment, the musical collaboration session may be realized by a local area network or other local connectivity tool (e.g. Bluetooth), which allows direct connection of devices on a local network without need for server 110 and API 220, which is hosted on server 110.

At step 305 of process 300, server 110 receives an activation request from any one of DAWs 230*a*-230*c* to initiate a musical collaboration session. In one embodiment, the DAWs 230*a*-230*c* may collaborate together over a session to compose music. For example, a user of DAW 230*a* corresponding to the computer workstation 130*a* may initiate a musical collaboration session or may access an ongoing musical collaboration session by accessing the plugin 240*a* integrated into the DAW 230*a*. The user interacts with the plugin 240*a*, either by clicking on the plugin 240*a* that is integrated into the DAW 230*a* or by a drag-and-drop operation of the plugin 240*a* onto the DAW 230*a*. In response, a user interface is generated on the computer workstation 130*a*. The user interface displays a prompt offering two options, as described above: (1) "Host a session" or (2) "Join an existing session". In this embodiment, the user selects "Host a session" and, in response, the selection plugin 240*a* of DAW 230*a* transmits an activation request for a new collaborative session to server 110 and the flow diagram proceeds to step 310.

In an embodiment, when the user selects "Join an existing session" on the user interface, plugin 240*a* of DAW 230*a* transmits a request to server 110 to join an existing session, and the flow diagram proceeds directly to step 330, which is described in greater detail below.

At step 310 of process 300, server 110, in response to receiving the activation request from plugin 240*a*, initiates a new collaborative session between the DAW 230*a* and API 220 hosted at the server 110. Initiating a new collaborative session between the DAW 230*a* and API 220 is performed by opening a communication channel dedicated between the DAW 230*a* and API 220 in order to transmit and receive data utilizing a session initiation protocol (SIP protocol). Upon initiating the new collaborative session, server 110 identifies DAW 230*a* as a host composer device 230*a*. Further, the communication channel of the new collaborative session is assigned a unique session ID 260 by the API 220. API 220 transmits the session ID to the host composer device 230*a*, or DAW 230*a*. Session ID 260 may take the form of a hyperlink or textual data that can be entered into a suitable text entry box by guest users to join the communication channel of the new collaborative session.

At step 315 of process 300, server 110 receives, as a portion of a musical composition stored at the server 110, first musical input data. The first musical input data may be generated by DAW 230*a* and stored with the musical composition in memory of the server 110. The musical composition, as obtained by the server 110 at step 315 of process 300, can be referred to as a stored musical composition, as in FIG. 4 (explained below). The musical composition may be a piece of a song, a complete song, or a piece of music from a musical instrument, although any piece of music may also be included in a musical composition. In one embodiment, the musical composition may be previously uploaded and stored in the memory of the server 110. The musical composition may also be referred to as a musical piece. In another embodiment, the musical composition may be stored in the memory based on a previous collaboration session performed by DAW 230*a*. In an embodiment, the musical composition may upload a file of the musical composition on to the server 110 by DAW 230*a*.

In an embodiment, contributions to the musical composition may be uploaded to the server 110 in real time by DAW 230*a*. This may be performed by a user of DAW 230*a*, by playing live music using a musical instrument or by singing using DAW 230*a* to upload the respective contribution to the musical composition on the server 110 over MIDI channels. In another embodiment, a musician can program MIDI using a keyboard or mouse, and can also use audio samples or synthesis to create sound. When the musical composition is previously stored in the memory of the server 110, then the server 110 may receive a request with an identifier of the musical composition from DAW 230*a*, during this operation, in order to access that musical composition and add the respective contribution.

At step 320 of process 300, the server 110 receives, from DAW 230*a*, a selection of musical parameter channel category associated with first musical input data. In one embodiment, the set of channels 250*a*-250*c* of the DAWs 230*a*-230*c* may be referred to as musical parameter channels. Each of the channels 250*a*-250*c* is a communication channel to transmit a musical parameter category of music. By way of example, musical parameter categories associated with channels 250*a*-250*c* may include, for example, a "Channel 1", "Channel 2", or "Channel 3", or, in the event the instrument is known, a "bass" channel, a "vocal" channel, a "kick drum" channel, a "guitar" channel, a "piano" channel, a "violin" channel, or a "master" channel. Of course, any other type of musical instrument data may also be included as part of the audio channels. In this example a "bass" channel is a channel dedicated to bass musical data, similarly a "vocal" channel is a channel dedicated to vocals data, a "kick drum" channel is a channel dedicated to kick drum musical data, a "guitar" channel is a channel dedicated to guitar musical data, a "piano" channel is a channel dedicated to piano musical data, and a "violin" channel is a channel dedicated to violin musical data. Further, a "master" channel is a channel that includes data from all types of musical parameter channel categories. The channels 250*a*-250*c* corresponding with the individual musical parameter categories, including a "bass" channel, a "vocal" channel, a "kick drum" channel, a "guitar" channel, a "piano" channel, a "violin" channel, are referred to as musical parameter channel categories.

In an embodiment, and in response to receiving the selection of musical parameter channel category, the server 110 may be configured to only sync the data associated with the selected channel(s). In an example, if the server 110 receives the selection of a "guitar" channel, then the server 110 would be monitoring for any changes in the "guitar" channel to sync during the collaborative session and would ignore the other channels. In another example, if the server 110 receives the selection of a "master" channel, then server 110 would be monitoring for any changes in all of the channels to sync during the collaborative session. Monitoring for changes by the server 110 is further explained below.

In certain embodiments, the exact names of channels in guest DAWs 230*b*-230*c* can be used, such as "Guitar 1" and "Guitar 2" channels. The host DAW 230*a* may be provided control over which parts of the composition are included in each iteration of the collaborative effort and which parts are excluded from such iterations. Musical collaboration system 200 may name each part through automatic or manual techniques as selected by the user.

At step 325 of process 300, the server 110 transmits the session ID generated at step 310 of process 300 to DAWs 230*b*-230*c*. The server 110 may provide the session ID 260 to DAW 230*b*-230*c* based on pre-defined transmission rules. DAWs 230*b*-230*c* are considered as potential guest users who may be interested in joining the new collaborative session. Pre-defined transmission rules may include, upon generating the session ID 260, the server 110 may automatically transmit the session ID 260 to DAW 230*b*-230*c*. Another transmission rule may include transmitting the session ID 260 at a predefined time to DAW 230*b*-230*c*. Other types of transmission rule may also be included. The transmission of the session ID 260 to DAW 230*b*-230*c* may be over a communication platform, by way of example, a communication platform may include an email message, chat message, or, text message, although any other types of communication platforms may also be included.

In an embodiment, DAW 230*a* may directly provide the session ID 260 to other potential guest users associated with the DAW 230*b*-230*c*, by sending the session ID in an email message, chat message, or, text message.

At step 330 of process 300, the server 110 receives a request to join the new collaborative session initiated by the host DAW 230*a* from DAW 230*b*-230*c*. Once session ID 260 is accessed, either by clicking a link of the session ID or by entering a textual data that can be entered into a suitable text entry box by guest users of guest composer devices DAWs 230*b*-230*c*, guest composer devices DAWs 230*b*-230*c* are presented with a user interface that provides options of "Join an existing session". When "Join an existing session" is selected, DAWs 230*b*-230*c* are given access to join the new collaborative session initiated by the host DAW 230*a* to collaborate together over a joint collaboration session. Upon the DAWs 230*b*-230*c* joining the new collaborative session, the server 110 identifies DAWs 230*b*-230*c* as guest composer devices 230*b*-230*c*.

At step 335 of process 300, the server 110 receives second musical input data from DAWs 230*a*-230*c*. Second musical input data may be a segment of an existing channel of the musical composition or may be a unique channel to be added to the musical composition. In this embodiment, the second musical input data may be uploaded to the server 110 in real time by DAWs 230*a*-230*c* over, for instance, MIDI channels. The second musical input data may be performed by a user of DAW 230*a*-230*c*, by playing live music using a musical instrument or by singing using DAWs 230*a*-230*c*, and uploaded 10 the server 110. In another embodiment, a musician can program MIDI using a keyboard or mouse, and can also use audio samples or synthesis to create sound.

In an embodiment, the DAWs 230*a*-230*c* may upload a file of contribution channels of the musical composition to memory at the server 110. In another embodiment, the DAWs 230*a*-230*c* may upload a file of contribution channels of the musical composition to database storage of the server 110, the database storage being a file system or, put another way, a Content Delivery Network, an Online Locker, an Online File System, and the like.

In an embodiment, and when the musical composition is previously stored in memory at the server 110, the server 110 may receive a request with an identifier of the musical composition from DAWs 230*b*-230*c* to access that musical composition.

At step 340 of process 300, the server 110 generates musical pieces by identifying new musical segments of the channels of the musical composition based on syncing performed between channels of the musical composition stored in the memory at the server 110 and the second musical input data received at step 335 of process. The second musical input data may, in an example, be associated with an existing channel of the musical composition.

In one embodiment, the musical composition may be uploaded and stored in the memory of the server 110. The memory of server 110 may be a database storing musical input data from respective channels. In an embodiment, the musical composition may be stored from a previous collaboration session performed by DAWs 230*a*-230*c*. In an embodiment, the musical composition may be a file of the musical composition uploaded to the server 110 by DAWs 230*a*-230*c*.

Figure 4:
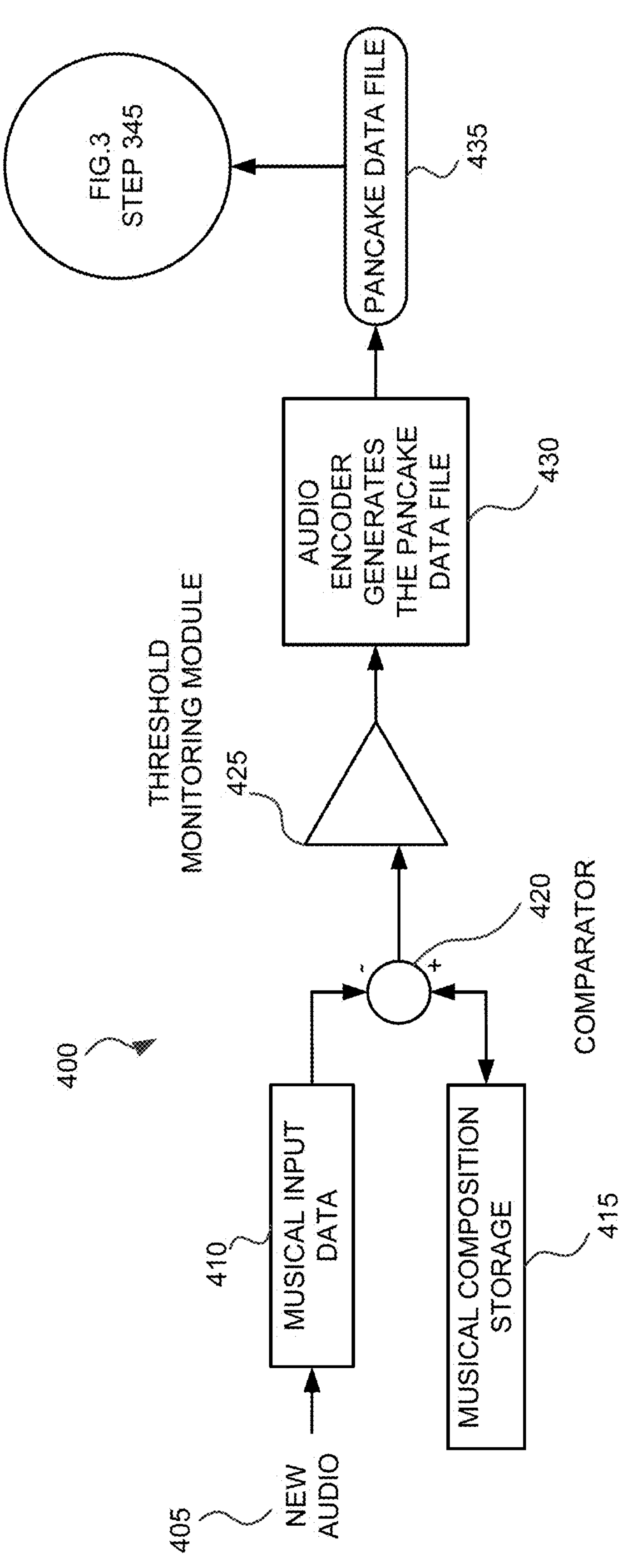
FIG. 4 is a flow diagram describing a process of generating encoded pancake data, according to an exemplary embodiment of the present disclosure.

Functions of step 340 of process 300 are further explained with reference to FIG. 4. FIG. 4 is a schematic block diagram of an exemplary new musical segments generation process 400, according to an embodiment of the present disclosure. It is to be understood that while new musical segment generation process 400 resembles an electrical circuit, embodiments of the present disclosure realize the processing through software, e.g., processor instructions executed by processors 125*b*-125*d* of FIG. 1.

FIG. 4 shows steps performed at server 110 and illustrates an embodiment of the present disclosure that maintains a buffer of "new musical input data" 405 indicated in the figure at new data buffer memory 410 at the server 110. In view of FIG. 3, the new musical input data 405 may be referred to as the second musical input data received, from DAWs 230*a-c*, during step 335 of process 300.

The new musical input data may be received during the collaborative session from a host composer device, in this example, DAW 230*a*, over the audio channels selected at step 320 of process 300. In this example, the selected audio channel is a "Guitar" channel. Accordingly, the new audio a piece of music would include music associated with the Guitar channel. The new musical input data may be played by DAW 230*a* by either playing instruments live (i.e., real time) or by playing a musical piece that was stored on the workstation 130*a* of DAW 230*a*. The new musical input data may be received by API 220 of musical collaboration system 200 from DAW 230*a*. When a collaborative session is initialized, the new audio, which corresponds to the selected audio channel of "Guitar", is received by the new data buffer 410 and passed on to API 220 of server 110 to perform step 420 of process 400. In an embodiment, the new musical input data may be received during the collaborative session from a host composer device, or DAW 230*a*, as well as from guest composer devices DAW 230*b-c*.

At step 420 of process 400, API 220 of the server 110 receives the new musical input data 405 and compares it with audio, of a corresponding channel, that is present in the stored musical composition in musical composition storage 415 at the server 110. As will be described herein, the comparison may be performed for a given channel of the musical composition. It can be appreciated, however, that the comparison may be for more a multitude of corresponding channels of the musical composition, based on the new musical input data 405 provided to the server 110.

In an example of new musical input data 405, or new data 405, named "Song AA", API 220 of the server 110 compares the audio received from a guitar channel of "Song AA" and the previously stored audio data from the guitar channel of "Song AA", or the stored musical composition. When API 220 of the server 110 identifies that at least a portion of the new musical input data 405 is different from a corresponding portion of the stored audio of the musical composition in storage 415, the API 220 of server 110 transmits the new audio 405 to the musical composition storage 415 at step 420 of process 400. Further, at step 420 of process 400, the API 220 of the server 110 transmits that portion of the new audio 405 to step 425 of process 400.

However, in an embodiment, when the API 220 of the server 110 identifies, at step 420, that at least a portion of the new audio 405 is not different with a corresponding portion of the stored audio in the musical composition storage 415, API 220 of the server 110 may transmit the new musical input data to components of musical collaboration system 200. Musical collaboration system 200 may act as a pass-through audio entity, receiving audio input and outputting the same signal without that signal being audibly affected. From the user experience standpoint, this implementation is transparent to the host user, which simply activates a control such as a spacebar to start playback at which point musical collaboration system 200 processes audio or MIDI data as a background procedure.

In an embodiment, when API 220 of the server 110 receives, at step 420 of process 400, the new audio 405, compares it with the audio that is stored in the musical composition storage 415 on the server 110, and identifies that there are no similarities between the new audio 405 and the stored musical composition, the API 220 of the server 110 transmits the new audio 405 to the musical composition storage 415. In an example, the new audio 405 may be "Song AA" and the API 220 of the server 110 may determine that the new audio 405 includes musical input data from a new channel of the musical composition, and so the new audio 405 may be transmitted to the musical composition storage 415 along with the identifier of the audio file i.e. "Song AA".

In an embodiment, and at step 420 of process 400, the API 220 of the server 110 identifies that at least a portion of the new audio 405 is different from a corresponding portion of the stored audio in the musical composition storage 415 and transmits the new audio 405 to the musical composition storage 415. Further, the API 220 performs step 430 of process 400, where an audio encoder processes the different portion of the new audio 405 to generate a pancake data file 435 without input from the API 220 of the server 110.

In another embodiment, and at step 420 of process 400, the API 220 of the server 110 transmits the new audio 405 to the musical composition storage 415 regardless of the presence of corresponding portions of the stored audio in the stored musical composition. Thus, the API 220 performs step 430 of process 400, where the audio encoder processes the portion of the new audio 405 to generate the pancake data file 435 without input from the API 220 of the server 110.

Assuming step 420 of process 400 identifies portions of new audio 405 that are different from stored audio in the musical composition storage 415, step 425 of process 400 includes determining, by the API 220 of the server 110, if the portion of the new audio 405 exceeds a predefined threshold time duration. When the API 220 of the server 110 determines that the portion of the new audio 405 does exceed a predefined threshold time duration, then the API 220 of server 110 transmits that portion of the new audio 405 to the audio encoder 430.

For example, the predefined threshold time duration may be 4 seconds. Assume the new audio contains 60 seconds of music and the identified portion of the new audio 405 that matches with the corresponding portion of the stored audio in musical composition storage 415 has a duration of 55 seconds at the beginning of the 60 second block. In this example, the first 55 seconds of the new audio has not changed in comparison to the corresponding stored audio. Thus, the identified portion of the new audio 405 that is different from the corresponding portion of the stored audio is the last 5 seconds, meaning that the identified portion of the new audio 405 that starts at 55 seconds and runs for 5 seconds until it reaches the 60 second mark exceeds the predefined threshold time duration of 4 seconds. Accordingly, as the threshold monitoring module 425 determines that the portion of the new audio 405 of with a time duration of 5 seconds does exceed a predefined threshold time duration of 4 seconds, then the threshold monitoring module 425 transmits that portion of the new audio 405 to the audio encoder 430. Further, as described above, this portion of the new audio 405 is also referred to as a "pancake data". In an embodiment, there may be multiple musical pieces also referred to as pancake data that may be identified during a musical collaboration session.

Of course, when the threshold monitoring module 425 determines that the portion of the new audio 405 that is different from the audio stored in the musical composition storage 415 does not exceed a predefined threshold time duration, then the threshold monitoring module 425 determines that no action is to be taken.

For example, the predefined threshold time duration may be 10 seconds. Assume the new audio contains 60 seconds of music and the identified portion of the new audio 405 that matches with the corresponding portion of the stored audio in the musical composition storage 415 has a duration of 5 seconds at the end of the 60 second block. In this example, the first 55 seconds of the new audio has not changed in comparison to the corresponding stored audio. Thus, the identified portion of the new audio 405 that is different from the corresponding portion of the stored audio is the last 5 seconds of the new audio, meaning that the identified portion of the new audio 405 starting at 55 seconds and running for 5 seconds until it reaches the 60 second mark does not exceed the predefined threshold time duration of 10 seconds. Accordingly, as the threshold monitoring module 425 determines that the portion of the new audio 405 of with a time duration of 5 seconds does not exceed a predefined threshold time duration of 10 seconds, then the threshold monitoring module 425 determines that no further operations are to be performed.

Upon encoding of the pancake data, the audio encoder 430 generates the pancake data file 435. In certain applications, data compression is employed on the pancake data for bandwidth efficiency and decreased upload times. For example, the pancake data is compressed to generate pancake data audio files that may be encoded in MP3 or OGG Vorbis formats, which preserve high quality while decreasing file size. In one embodiment, system 200 may use a time format other than seconds for encoding a pancake of a specific length, for example, every 8 beats, every 5 seconds, or using Society of Motion Picture and Television Engineers (SMPTE) time, or any other format appropriate for storing timecode data.

Returning to FIG. 3, step 345 of process 300 stores the generated pancake data file 435. The API 220 may be accessed and information about the pancake data may be uploaded to the data storage 210, where such information may include, as synchronization data, the time range where the pancake data file 435 was created (e.g., from 55 seconds to 60 seconds, with a total of 5 second duration). The new pancake data file 435 may be formatted into a music data file, e.g., an MP3 or OGG file, and provided to the API 220 for the purposes of storing the pancake data file 435 in cloud data storage 210, or memory, on the server 110 so as to be shared with other collaborators in the same session. It is to be understood that the pancake data file 435 may comprise the entire length of the musical composition based on the percentage of new audio that is different from the stored audio within the musical composition storage 415. In other words, the updated section of stored audio need not be limited to the 5 second examples described above.

In an embodiment, system 200 may upload a pancake data file directly to cloud data storage 210 (e.g., server 110), bypassing the need to communicate through API 220. Cloud data storage 210 may be a database that stores all the generated pancake data files. Such an arrangement may reduce bandwidth requirements and may eliminate a "man-in-the-middle" issue, as long as those files arrive at cloud data storage 210 and the guest DAWs 230*b*-230*c*, directly.

At step 350 of process 300, the server 110 may, upon storing the pancake data file 435, transmit the pancake data file 435 directly to all composers including host composer devices DAW 230*a* and guest composer devices 230*b-c* connected in the same. Such an implementation may require incoming data connections at DAWs 230*a-c*, such as Bluetooth, a local connection over wireless network, a USB connection, or any other wired or wireless connections over which transmission can be achieved.

At step 355 of process 300, the server 110 merges identified musical input data, also referred to as pancake data files 435, with musical input data of stored musical compositions. The server 110 may utilize the API 220 to monitor which of the pancake data files 435 contain the latest musical information and may transmit only the most recent pancake data files 435. By way of example, upon storing a pancake data file named "A", the server 110 may determine if there is an older version of the pancake data file A that is previously stored in the musical composition storage 435. If there is an older version of the pancake data file named "Z", the server 110 determines that pancake data file A is the latest version of musical piece, as it is generated after pancake data file Z was generated. The age of the musical input data can be determined according to associated synchronization data that includes a corresponding time stamp. The time stamp indicates the time pancake data file was generated. Accordingly, server 110 compares a first time stamp, by way of example, 2:30 pm on Jun. 5, 2020 associated with pancake data file A with a second time stamp, by way of example, 4:30 pm on May 5, 2020 associated with pancake data file Z. Based on the comparison, server 110 determines that pancake data file A is the latest version of musical input data as it is generated after pancake data file Z.

In another embodiment, step 355 of process 300 includes merging, by the client software at the DAWs 230*a-c*, stored musical input data with updated musical input data, also referred to as pancake data files 435, based on monitoring for updates to stored musical input data of a musical composition. For instance, identification of the update may be performed by the server 110 or by the client software, of DAW, and the client software can perform the merging of the musical pieces based on the identification of an update within the musical piece.

The merging stored musical input data is further explained, by way of example, with reference to first pancake data file "pancake 1" stored in the musical composition storage 415. The "pancake 1" is part of a musical composition, or, for example, "Song 1". "Song 1" has duration of 4 minutes and 30 seconds. Further, by way of example, "pancake 1" contains audio data from 0 seconds to 60 seconds of "Song 1", which has a duration of 4 minutes and 30 seconds. A newer stored pancake data file, by way of example, "pancake 2", also associated with "Song 1", contains audio data from 55 seconds to 60 seconds of "Song 1" that has a duration of 4 minutes and 30 seconds. In this example, the API 220, based on predefined instructions, may enforce that the ultimate musical composition contains a combination of both pancake data files i.e. "pancake 1" and "pancake 2". By merging older pancake data files with newer ones, people listening to the session will hear a merged result that contains the combined latest audio, even if the audio was not recorded continuously in one take. In the above example, "pancake file 2" will replace the audio portion of 55 seconds to 60 seconds, by replacing corresponding portion of 55 seconds to 60 seconds from "pancake file 1" that contains audio data from 0 seconds to 60 seconds. A smaller pancake data file lying over a larger pancake data file will obscure a small portion of the larger pancake data file. Thus, the pancake metaphor is used. This merging action of multiple audio pancake data files can be performed by the server 110, the host composer device 230*a*, guest composer devices 230*b-c*, or the API 220, itself.

In an embodiment, the server 110 stores pancake data file 435 in the musical composition storage 415 with a corresponding unique identifier of the an audio file. In an example, this may be audio file 1 having a time stamp which includes date, time, and day the pancake data file 435 was generated. This unique identifier may be a number, or text that corresponds to the audio file. Accordingly, in the future, the server 110 stores all other pancake data file 435 associated with audio file 1 with the same unique identifier. As a result, upon storing each of the pancake data file 435, the server 110 will identify all the pancake data files associated with the audio file 1 unique identifier and, based on the time stamp of the pancake data file, determine the latest version of the pancake data file to be merged with an older version of a pancake data file, as explained earlier.

In step 360 of process 300, and assuming the server 110 performs the merge at step 355 of process 300, the server 110 transmits the merged version of the musical composition to all composers, including host composer devices DAW 230*a* and guest composer devices 230*b-c* connected in the same session. Such an implementation may require incoming data connections at DAWs 230*a*-230*c*, such as Bluetooth, a local connection over wireless network, a USB connection, or any other wired or wireless connections over which transmission can be achieved.

In an embodiment, the guest composer devices DAWs 230*b*-230*c* download information about the musical collaboration session from the API 220, which was originally provided by the host composer device DAW 230*a*. This information may contain metadata, or synchronization data, associated with first musical input data, which includes a length of a song, a name of the song, how many channels of audio and MIDI the song contains, a tempo of the song, the key and scale of the song, the time signature associated with the song, and other similar information. In a situation where the guest composer devices DAWs 230*b-c* are set to a wrong tempo, the DAWs 230*b-c* software may, based on the synchronization data, warn guest users that the tempo (or other metadata) must be changed to match the tempo of the host composer device DAW 230*a*. In certain embodiments, pancake data files 435 having the incorrect tempo may be automatically filtered out from consideration. This avoids situations where host composer device DAW 230*a* and guest composer devices DAWs 230*b-c* can go off-time from each other. In addition to the song metadata/synchronization data, each pancake data file, or each audio channel may also contain additional communication such as comments, emojis, votes, and conversation threads to enable participants to discuss their work with each other. In certain embodiments, a rating system may dictate which pancake data file is placed atop other pancake data file. In yet another embodiment, the musical collaboration session initiated at step 310 of process 300 may present a user interface 800 as illustrated in FIGS. 8A-8D.

Figure 5:
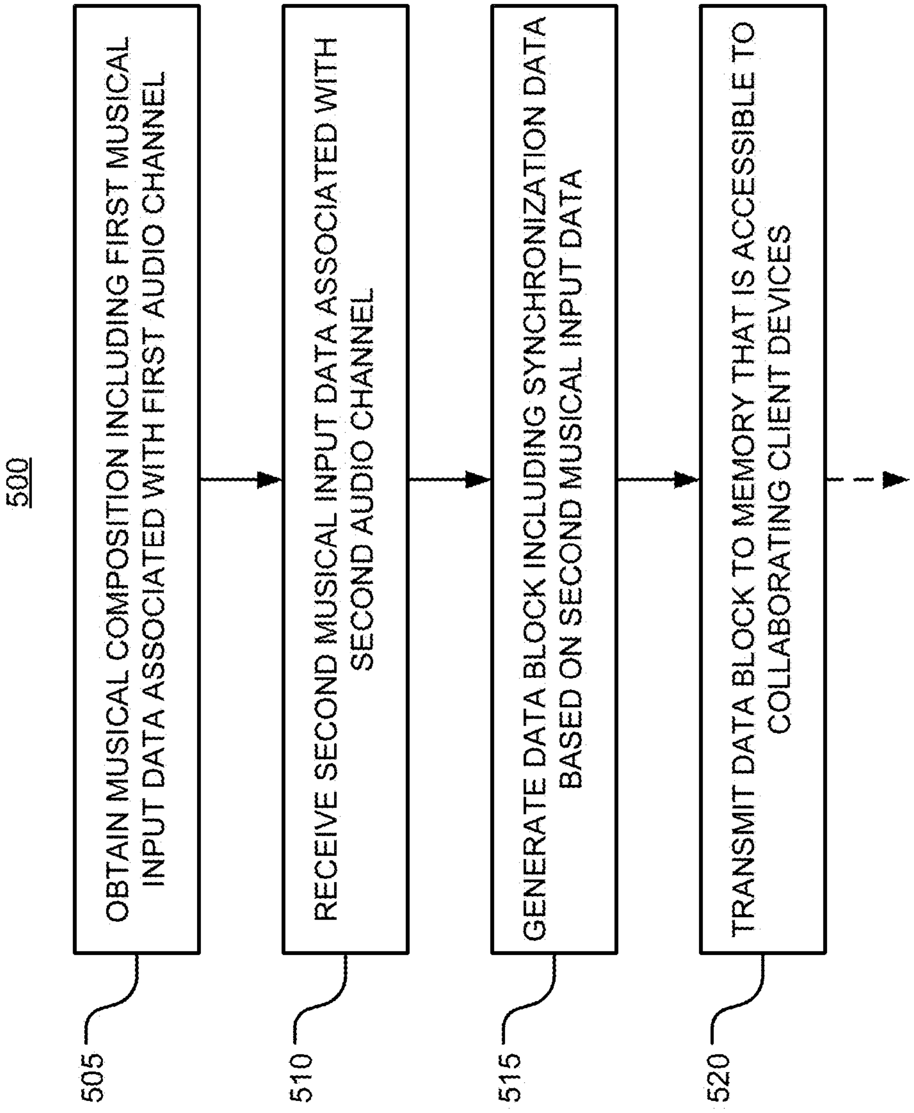
FIG. 5 is a flow diagram of a method of collaboration across multiple digital audio workstations, according to an exemplary embodiment of the present disclosure.

With reference now to FIG. 5, a description of process 500 is provided. Process 500 includes appending a new channel of musical input data to an existing musical composition. Process 500 may be performed by the server 110.

At step 505 of process 500, the server 110 may obtain a musical composition from the musical composition storage 415. The musical composition may include, at least, first musical input data pf a first channel of the musical composition. The first channel may be an audio channel such as a "guitar" channel.

At step 510 of process 500, the server 110 may receive second musical input data associated with a second channel of the musical composition. The second channel may be an audio channel. The second musical input data can be provided by a client device such as any one of the host composer DAW 230*a* and the guest composer DAWs 230*b-c*. The second audio channel may not be previously present in the musical composition.

At step 515 of process 500, and appreciating that the second musical input data is associated with a second audio channel that is different from the first audio channel and not present in the musical composition, the server 110 may generate a data block. The data block may include pancake data associated with the second musical input data and synchronization data. In an embodiment, the synchronization data may include timing data associated with the second musical input data, the timing data allowing the pancake data to be located within the timeline of the musical composition and relative to the first musical input data of the first audio channel. The synchronization data may also include metadata associated with the second musical input data, such as tempo and the like, as described above.

At step 520 of process 500, the data block generated at step 515 of process 500 can be transmitted to memory, or another storage device, at the server 110. In an embodiment, the memory or the other storage device may be integral with the musical composition storage 415.

In an embodiment, and following step 520 of process 500, processes similar to step 355 of process 300 may be performed by the server 110 in order to merge the pancake data associated with the second musical input data of the second audio channel and the first musical input data of the first audio channel of the musical composition. In another embodiment, and following step 520 of process 500, the data blocks stored at the memory may be accessible to any of the host composer DAW 230*a* and the guest composer DAWs 230*b-c*. As a result, each data block can be merged with the larger musical composition at the one of the host composer DAW 230*a* and the guest composer DAWs 230*b-c*. In this way, only the data block need be downloaded to each client device executing the host composer DAW 230*a* and the guest composer DAWs 230*b-c*, eliminating the need to download an entire musical composition at each update.

Figure 6A:
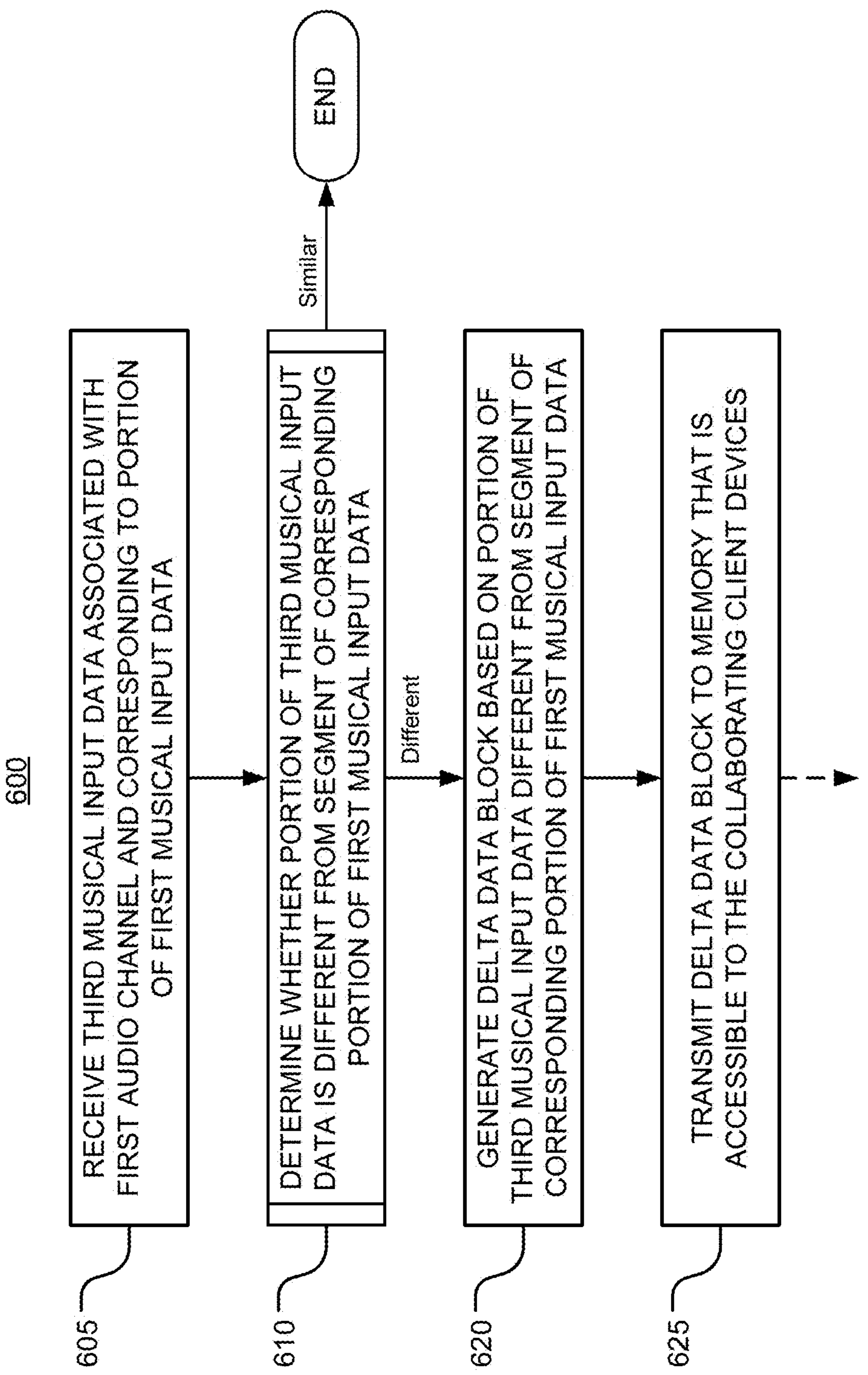
FIG. 6A is a flow diagram of a method of collaboration across multiple digital audio workstations, according to an exemplary embodiment of the present disclosure.

With reference now to FIG. 6A, a description of process 600 is provided. Process 600 includes determining if new musical input data of a given channel includes audio that is unique from corresponding musical input data within the musical composition stored in the musical composition storage 415. Process 600 may be performed by the server 110.

At step 605 of process 600, and in view of FIG. 5, third musical input data associated with the first channel may be received by the server 110. The first channel may be the first audio channel and the third musical input data may correspond to at least a portion of the first musical input data associated with the first audio channel.

Figure 6B:
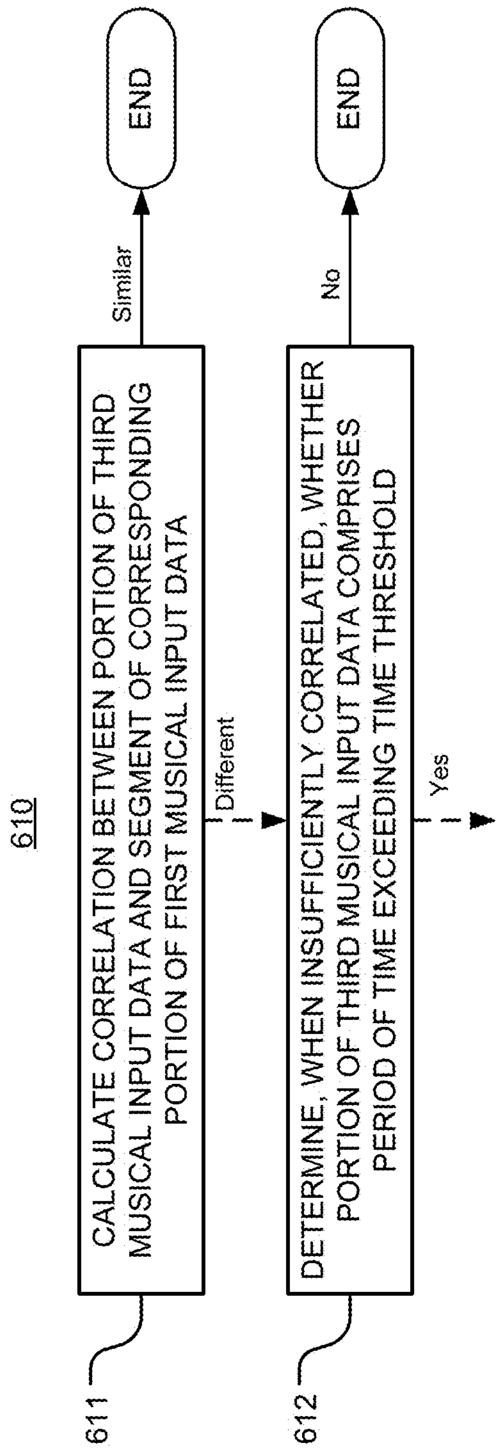
FIG. 6B is a flow diagram of a sub process of a method of collaboration across multiple digital audio workstations, according to an exemplary embodiment of the present disclosure.

At sub process 610 of process 600, the server 110 determines whether a portion of the third musical input data is different from a segment of the corresponding portion of the first musical input data. Sub process 610 of process 600 will now be described with respect to FIG. 6B.

In an embodiment, and at step 611 of sub process 610, the server 110 is configured to calculate a correlation value between the portion of the third musical input data and the segment of the corresponding portion of the first musical input data. A corresponding portion of the first musical input data can be defined as portions of the first musical input data and the third musical input data having similar timings within the musical composition, as defined by synchronization data associated therewith. In an example, the correlation value may be calculated for an entire length of the third musical input data that corresponds to a segment of the first musical input data, for successive segments of the length of the third musical input data that corresponds to segments of the first musical input data, or for another duration of the musical composition wherein there are corresponding time sequences between the third musical input data and the first musical input data. A comparison of the calculated correlation value with a threshold correlation value, the threshold correlation value being selected so as to determine the compared musical input data are sufficiently different, indicates whether the newly received third musical input data is different from the first musical input data. When determined to be different, or relatively uncorrelated, process 600 may process to step 610. When determined to be similar, sub process 610 of process 600 ends.

In an embodiment, and following determining, at step 611 of sub process 610 the portion of the third musical input data is different from the segment of the corresponding portion of the first musical input data, sub process 610 may proceed to step 612, wherein a time length of the different portion of the third musical input data is evaluated relative to a time length threshold. This evaluation may be a comparison of the time length to the time length threshold, the evaluation serving as a second evaluation of the correlation comparison at step 611 of sub process 610. For instance, if the time length threshold is 3 seconds, a 2 second portion of the third musical input data, determined to be different at step 611 of sub process 610 would not be considered different, for long enough, at step 612, and thus sub process 610 would end. Of course, if the portion of the third musical input data that is different from the segment of the corresponding portion of the first musical input data has a time length of 20 seconds, step 612 would determine the difference to be legitimate and would pass the result to step 620 of process 600.

Returning to FIG. 6A, when the portion of the third musical input data is determined to be different at sub process 610 of process 600, a delta data block can be generated at step 620 of process 600. The delta data block can be based on the portion of the third musical input data that is different from the segment of the corresponding portion of the first musical input data and can include pancake data corresponding to the portion of the third musical input data as well as synchronization data identifying timing of the contribution to the musical composition.

The delta data block generated by the server 110 at step 620 of process 600 can be transmitted to memory, or other storage device, of the server 110 at step 625 of process 600. In an embodiment, the memory or the other storage device may be integral with the musical composition storage 415.

In an embodiment, and following step 625 of process 600, processes similar to step 355 of process 300 may be performed by the server 110 in order to merge the pancake data associated with the third musical input data of the first audio channel and the first musical input data of the first audio channel of the musical composition.

In another embodiment, and following step 625 of process 600, the delta data block stored at the memory may be accessible to any of the host composer DAW 230*a* and the guest composer DAWs 230*b-c*. As a result, the delta data block can be merged with the larger musical composition at the one of the host composer DAW 230*a* and the guest composer DAWs 230*b-c*. In this way, only the delta data block, including the pancake data and the synchronization data, need be downloaded to each client device executing the host composer DAW 230*a* and the guest composer DAWs 230*b-c*, eliminating the need to download an entire musical composition at each update.

Figure 7A:
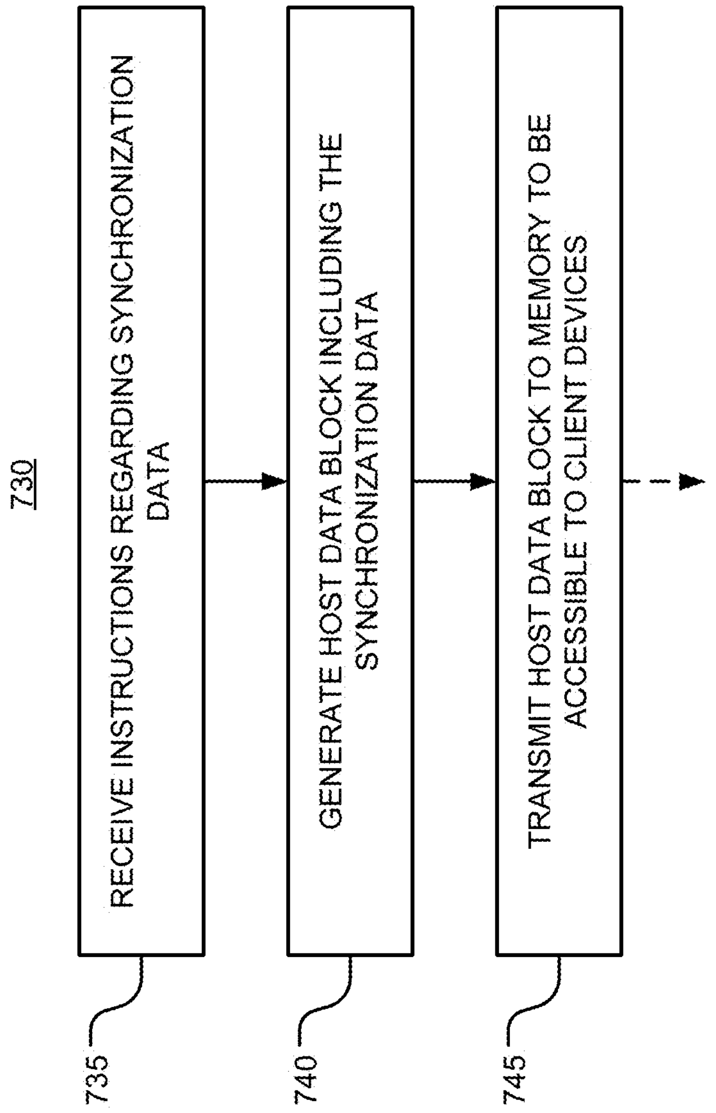
FIG. 7A is a flow diagram of a method of collaboration across multiple digital audio workstations, according to an exemplary embodiment of the present disclosure.

FIG. 7A describes a flow diagram wherein a host composer DAW 230*a* provides synchronization data dictating parameters of the musical composition to guest composer DAWs 230*b-c*. Process 730 can be performed by the server 110.

At step 735 of process 730, the server 110 receives instructions regarding synchronization data dictated by the host composer DAW 230*a*. The instructions may include a length of a musical composition, a name of the musical composition, how many channels of audio and MIDI the musical composition may contain, a tempo of the musical composition, the key and scale of the musical composition, the time signature associated with the musical composition, and other similar information. The server 110 may generate, at step 740 of process 730, a host data block including the synchronization data. At step 745 of process 730, the generated host data block may be transmitted to the memory, or other storage device, of the server 110 in order to be accessible to the guest composer DAWs 230*b-c*.

Figure 7B:
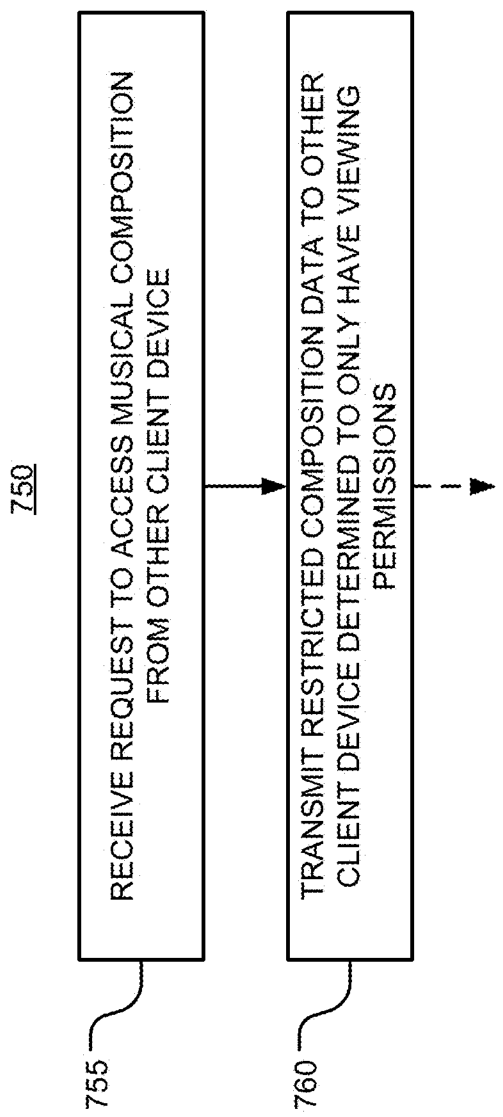
FIG. 7B is a flow diagram of a method of collaboration across multiple digital audio workstations, according to an exemplary embodiment of the present disclosure.

FIG. 7B describes a flow diagram wherein a guest composer DAW 230*b-c* transmits a request to access the musical composition. Process 750 of FIG. 7B may be performed by the server 110.

At step 755 of process 750, the server 110 may receive a request from a guest composer DAW 230*b-c* to access the musical collaboration. The host composer DAW 230*a* may evaluate the request or the server 110 may evaluate the request in view of a host data block (described in FIG. 7A) in order to determine what permissions the guest composer DAW 230*b-c* is allowed. For instance, as in FIG. 7B, the requesting guest composer DAW 230*b-c* may only be allowed to view and play-back the musical composition on their device. Accordingly, at step 760 of process 750, the server 110 transmits restricted musical composition data to the guest composer DAW 230*b-c*. The restricted musical composition data may include a play-back only version of the musical composition. Such a version of the musical composition allows for muting, adjusting volume, and other play-back features of the DAW, but does not reflect any changes made by the guest composer DAW 230*b-c* to the server 110 to be incorporated into the musical composition presently being collaborated on. This allows users that are not contributing to a channel of the musical composition to be able to view and/or participate in the making of the music.

Of course, even though the guest composer DAW 230*b-c* may not be able to 'edit' the musical composition, any updates made by 'editing' members of the collaboration will be realized at the guest composer DAW 230*b-c* in the same way as described above.

Figure 8A:
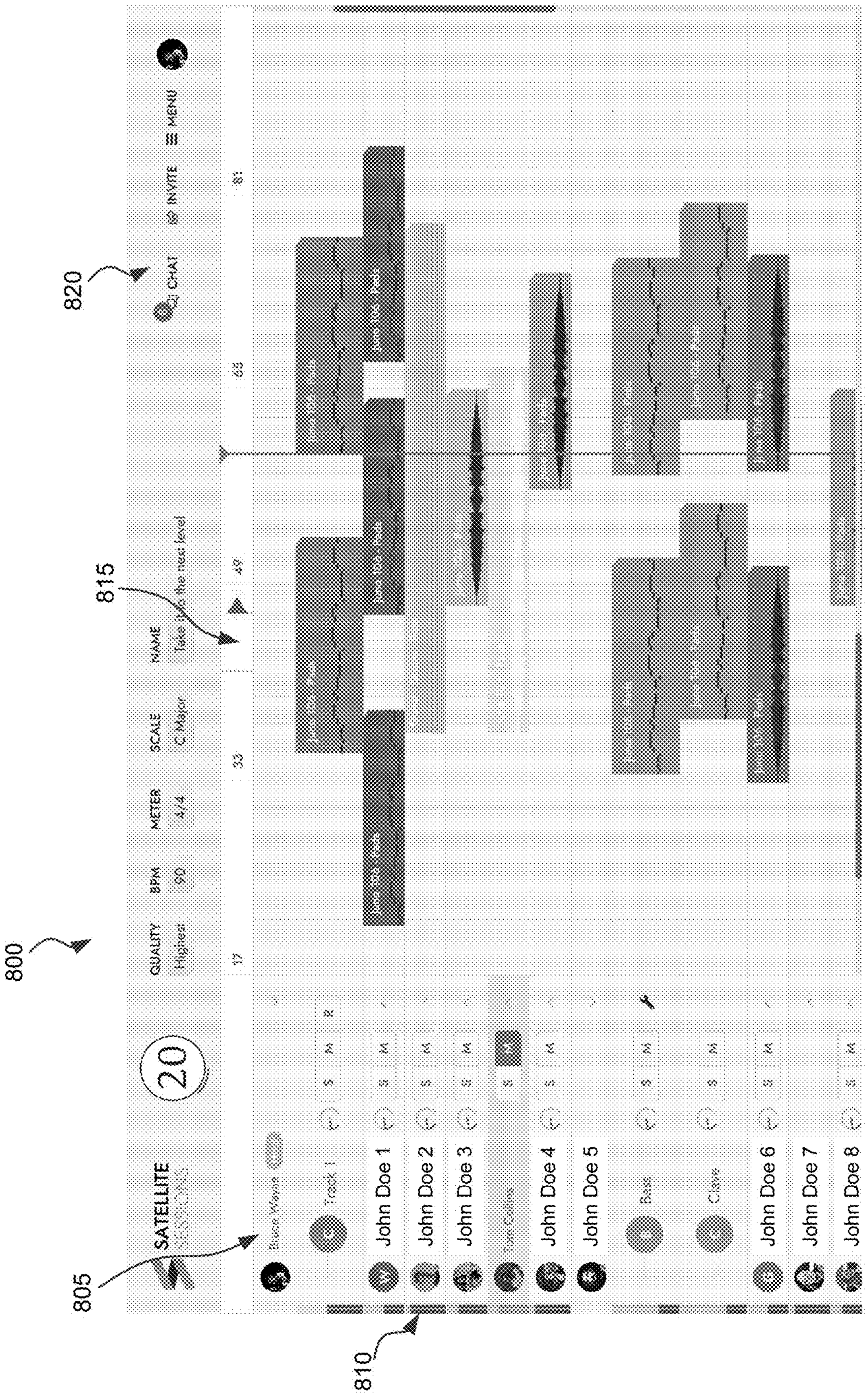
FIG. 8A is a user interface that is utilized for the process of collaboration across multiple digital audio workstations, according to an exemplary embodiment of the present disclosure.
Figure 8B:
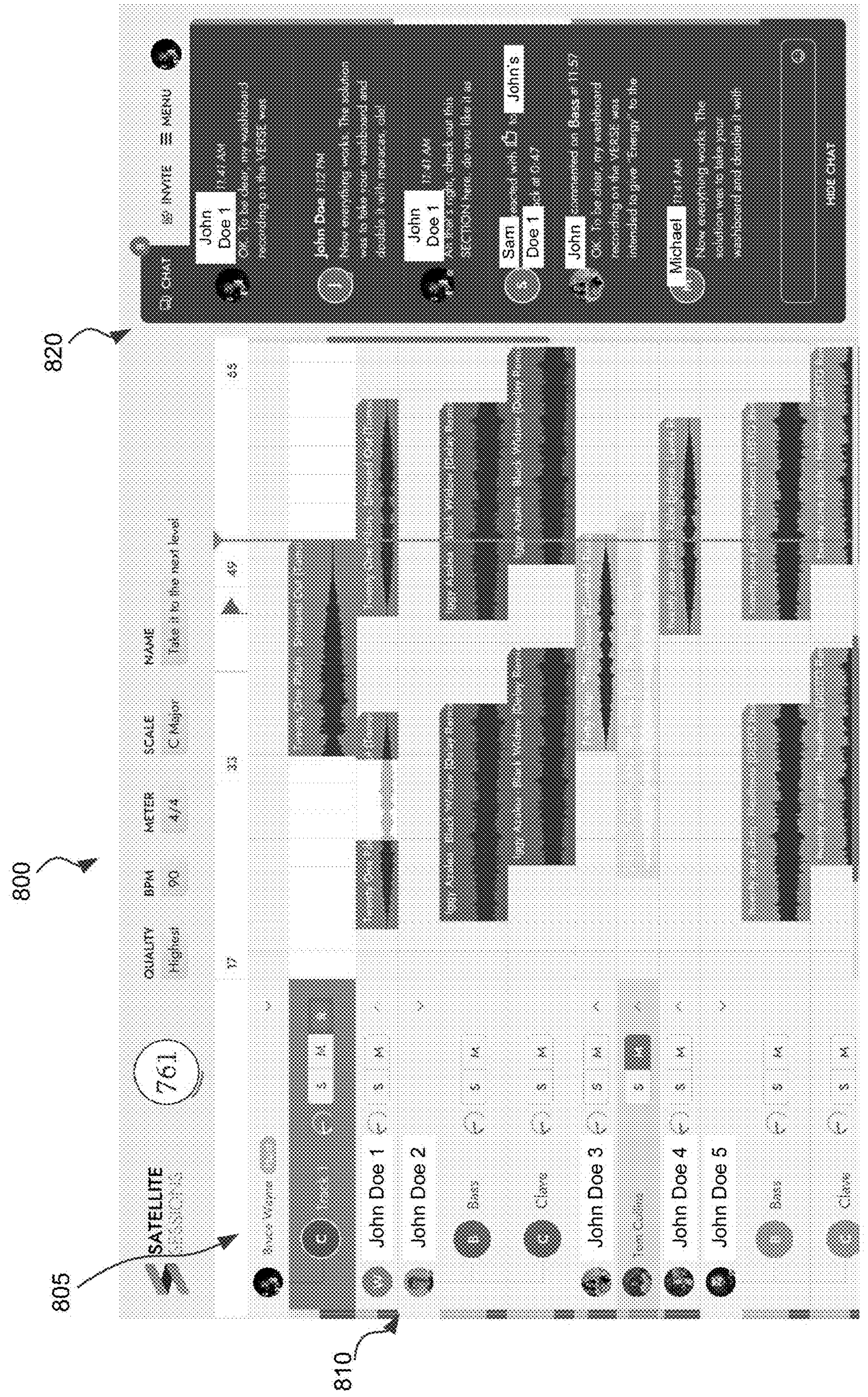
FIG. 8B is a user interface that is utilized for the process of collaboration across multiple digital audio workstations, according to an exemplary embodiment of the present disclosure.

With reference now to FIG. 8A through FIG. 8D, and in view of FIG. 3, user interface 800 illustrates a musical collaboration session hosted by host user 805 and including guest users 810. Corresponding to each of the users the user interface illustrates a second musical input data received. Further, user interface 800 on FIG. 8B illustrates a chat window 820 presented that allows participants of the musical collaboration session, which includes host user associated with DAW 230*a* and guest users 810 associated with composer devices DAWs 230*b-c*, to communicate with each other by send messages and emojis.

The plugins associated with host composer device DAW 230*a* and guest composer devices DAWs 230*b-c* may be connected, either directly or via the API 220. Further, when a new pancake data file is stored to the cloud at step 345 of process 300, the server 110 generates a signal to send to the host composer device DAW 230*a* and guest composer devices DAWs 230*b-c*, notifying that a new pancake data file is available. In another embodiment, when a new pancake data file is stored to the cloud, the server 110 applies the new pancake data file to the existing musical composition within the musical composition storage 415, overlaying any older portions of audio from previous pancake data files (as explained above). As mentioned previously, this merging action of combining multiple pancakes into one "latest" audio output can be performed by the server 110, host composer device DAW 230*a*, and/or guest composer devices DAWs 230*b-c*.

In the event that the guest composer devices DAWs 230*b-c* are not logged into the musical collaboration session at the time a pancake data file 435 is generated by host composer device DAW 230*a*, then the guest composer devices DAWs 230*b-c* may be notified by an in-app notification, a text message, email, or another communication technique to indicate to them that the host composer device DAW 230*a* has created new pancake data file 435 and uploaded it to the cloud storage (e.g., musical composition storage).

In an embodiment, smooth collaboration is enabled by the automatic capture of audio input data on both the host composer device DAW 230*a* and the guest composer devices DAWs 230*b-c* sides of the collaboration. As hosts user 805 and guests users 810 scroll through their projects in the user interface 800 and hit "play" 815 to hear the at least a portion of the musical composition, any new changes are automatically captured and encoded to generate new pancake data files 435. The new pancake data files 435 can be uploaded and shared with other participants in the musical collaboration session.

In an embodiment, it is possible for the host composer device DAW 230*a* and the guest composer devices DAWs 230*b-c* to mark their respective contributions to the musical composition as private (for the host's eyes only) or as public (for everyone to hear). In marking a musical contribution as public, other participants are able to hear the work directly.

Figure 8C:
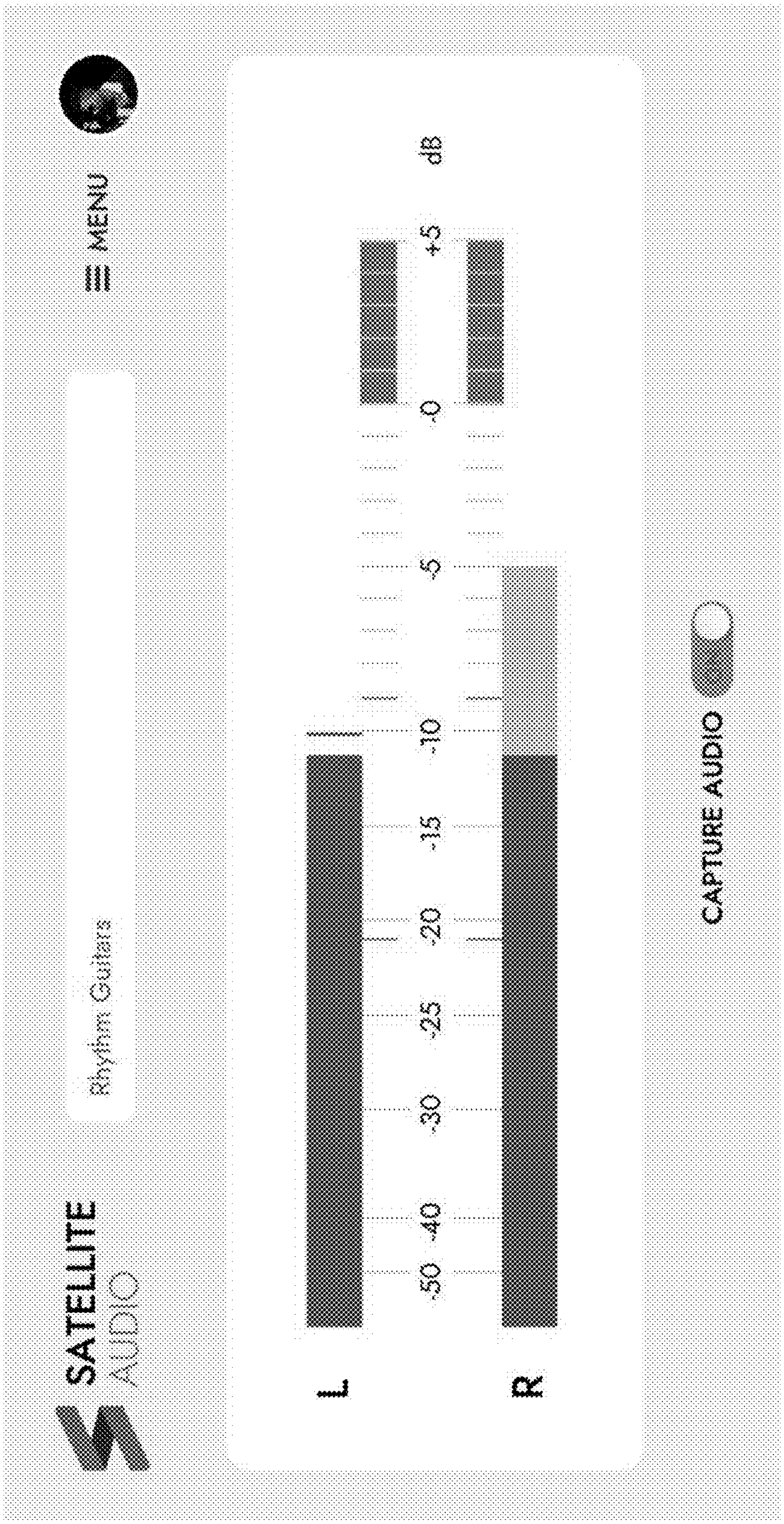
FIG. 8C is a user interface that is utilized for the process of collaboration across multiple digital audio workstations, according to an exemplary embodiment of the present disclosure.

Embodiments of the present disclosure described herein allow the host composer device DAW 230*a* and the guest composer devices DAWs 230*b-c* to work together in real-time but independently. Further, embodiment of the present disclosure described herein allow the host composer device DAW 230*a* and the guest composer devices DAWs 230*b-c* to make changes to their audio inputs without affecting what guest composer devices DAWs 230*b-c* see on their user interface 800 and without interfering with the guest composer devices DAWs 230*b-c* recording their own versions and additions during the musical collaboration session. For example, the host composer device DAW 230*a* may be working, as shown in FIG. 8C, on chords and melodies on the guitar, a first channel of the musical composition, while the guest composer devices DAWs 230*b-c* are recording vocals, an at least second channel of the musical composition. Since this approach allows both the host composer device DAW 230*a* and guest composer devices DAWs 230*b-c* to co-exist, it replicates the approach to collaboration amongst musicians working face to face. It solves the problem where two musicians cannot use one computer because they cannot attach two keyboards, two mice, or two touch devices. Instead, each musician in this approach has their own computer, and can control the channels of audio independently and create new parts, while having an easy way to sync them together. Moreover, local DAW playback of the collaborative musical piece can be performed using synced audio from the downloaded inputs from guest composer devices DAWS 230*b-c* as well as local adjustments made via any one of the composer devices involved in the collaboration.

In an embodiment, at step 320 of process 300, along with receiving a selection of a channel from host composer device DAW 230*a*, the server 110 may also receive a criterion of a time range associated with a second musical input data file that one of a guest composer device DAWs 230*a-c* may upload. For example, the second musical input data may be provided by respective guest composer devices DAWs 230*b-c* and may have a duration of less than 60 seconds. In another embodiment, the guest composer devices DAWs 230*b-c* contribute ideas back to the host composer device DAW 230*a*. Once the guest composer devices DAWs 230*b-c* are connected to a musical collaboration session, the guest composer devices DAWs 230*b-c* can click a respective button called "Upload a Take" on user interface 800. The "Take" may be an audio file containing musical input data that fit into a time range specified by the host composer device DAW 230*a*. For example, all music from 0 seconds to 60 seconds may be the "Take". The guest composer devices DAWs 230*b-c* may label each take with a name, ex: "Great vocals for the song", or append additional metadata to it, such as their own user name, their contact information, and any notes that may be relevant to the creative process.

In an embodiment, all audio captured from guest composer devices DAWs 230*b-c* may be auto-uploaded as musical input data to the musical collaboration session without requiring the user to click an "upload" button.

In an embodiment, once a pancake data file associated with guest composer devices DAWs 230*b-c* is uploaded to the API 220, the host composer device DAW 230*a* may be notified that a new pancake data file, also referred to as a new audio take, is available. The host composer device DAW 230*a* can open their own session, and scroll/tab through the list of available audio submissions, or musical input data submissions, from different guest composer devices DAWs 230*b-c*. Those submissions may be optionally sorted by user name, by date of upload, by comments, or any other metadata column to identify who created the take and when. Further, by selecting and loading a take, the host composer device DAW 230*a* will be able to hear the audio coming from their own speakers. Selecting a take allows for both playback and the ability to drag the take onto the user interface 800, from where the pancake data file is stored, as an exported audio file. At the host composer device DAW 230*a* discretion, the same take could become part of the official output that gets encoded into pancakes and sent to any other guest composer devices DAWs 230*b-c*. This approach allows hierarchical host-guest synchronization, followed by guest composer devices DAWs 230*b-c* contributing an idea that gets auditioned by the host composer device DAW 230*a*, and possibly distributed to other guests as part of the host's role in deciding what audio parts are distributed everyone in the session.

Guest-guest collaboration is also possible. In an embodiment, guest composer device DAW 230*b* can share takes with guest composer device DAW 230*c*, bypassing the host composer device DAW 230*a* oversight and allowing direct collaboration inside the same session. In an embodiment, and at the guest's discretion, it may be possible to mark a take as "available to all guests", or "available to host only", allowing a permissions-based, limited amount of sharing between guest composer devices DAWs 230*b-c* and host composer device DAWs 230*a*.

In addition to distributing audio files, it is common amongst musicians to collaborate using MIDI format, introduced above, which allows musical notes to be passed between musicians instead of merely audio. MIDI is the digital equivalent to sheet music. MIDI allows the producer to change what instrument is playing the sound of the melody captured by the musical notes. For example, the same MIDI file can be played using a digital synth, a digital bass, or a sampled violin. MIDI files are more flexible than audio files because they allow the sound designer to change the sound while keeping the same musical pitch and rhythm of the original composition.

To exchange MIDI files, the following augmentation to the original idea may be implemented. In addition to having regular "audio effect" software that can be put on any channel, embodiments of the technology may create "shell host" software that can be added to a MIDI channel as an instrument. This software has a simple user interface to select which musical instrument should be chosen to perform the audio. This instrument could be another third-party plugin, such as Sylenth. Adding this "shell host" software to the DAW would result in MIDI notes being input into the plugins 240*a-c*, and audio coming out, both of which can be captured as MIDI pancake data files and encoded by the audio encoder at step 430 of process 400 and uploaded to the cloud.

Figure 8D:
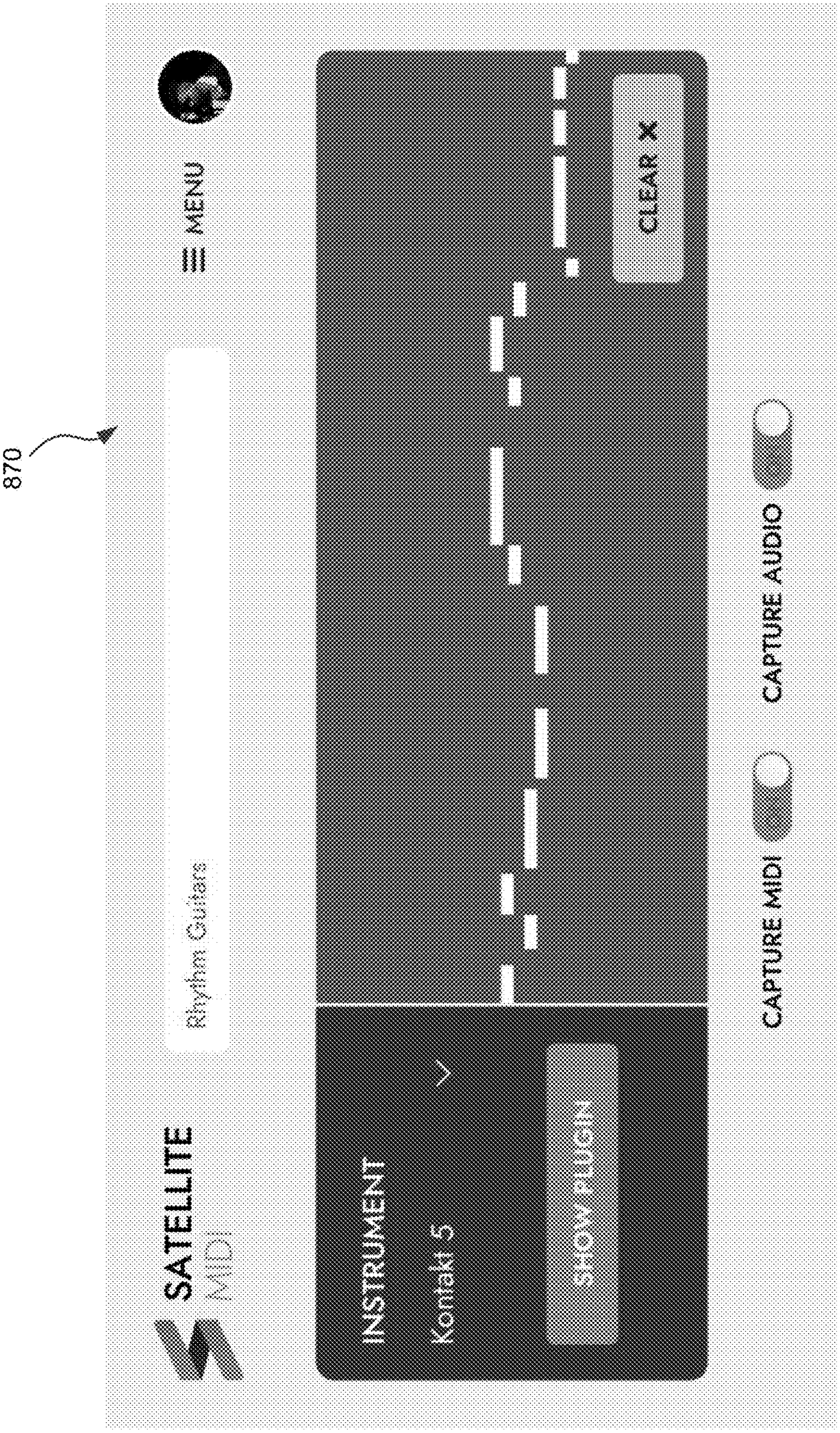
FIG. 8D is a user interface that is utilized for the process of collaboration across multiple digital audio workstations, according to an exemplary embodiment of the present disclosure.

In an example, a visualization of this process is shown in FIG. 8D and with reference to FIG. 4. A MIDI clip may be received by DAW 230*a*. The MIDI clip is input into the Shell Software, which may be used to select 'Kontakt 5' as the instrument 870. The MIDI input is captured and encoded as MIDI pancake data file by the Shell Software. MIDI pancake data is received by the third-party software hosted inside the shell software to synthesize audio as if it was originally performed using the 'Kontakt 5'. The third-party software captures the audio output of the third-party software and encodes it as an audio pancake data file. In this way, the MIDI and the audio are being captured. The audio pancake data file is passed back to the DAW 230*a* resulting in a simple workflow for musicians who already use instruments in their DAW 230*a*.

In an embodiment, the shell software is added at the start of the sound design chain, more plugins 240*a-c*, such as reverb and echo, may be added in the middle of the chain, and finally, one more regular session software instance may be added at the end to capture the final audio signal with all the modifications. This would result in three pancake data files being generated automatically: (1) the MIDI pancake, (2) the audio pancake immediately following the synthesis of the sound inside the shell plugin by the third-party plugin, and (3) the sound design at the end of the entire chain after all other effect plugins have been applied. All three segments may be shared with guest users.

In an embodiment, a "read receipt" style monitoring may be performed on all takes to make sure that the target audience (guest composer devices DAWs 230*b-c* and host composer device DAWs 230*a*) has heard it. For example, if the guest composer devices DAWs 230*b-c* uploaded a take to the host composer device DAWs 230*a*, the API 220 can be aware of whether the host composer device DAWs 230*a* has heard that take. If not, the host composer device DAWs 230*a* may be notified that a new take is waiting.

In an embodiment, a pancake data file 435 can be emailed or otherwise sent to the guest composer devices DAWs 230*b-c* and host composer device DAWs 230*a* to hear the resulting audio file as an attachment. All the pancake data files can be merged together and the final output can be mixed for an easy listening on the go, for example, in an email attachment or inside a mobile app.

The present disclosure allows multiple software instances to exist inside the same session. The host composer device DAWs 230*a* can add a "kick" software instance on the kick stem, a "snare" software instance on the snare stem, etc. The guest composer devices DAWs 230*b-c* can choose which of those stems to enable/disable when listening to the session inside the guest composer devices DAWs 230*b-c*. This selective mute/solo/volume editing approach allows the guest composer devices DAWs 230*b-c* to replace an element already created for the host composer device DAW 230*a*, for example, the guest composer devices DAWs 230*b-c* may suggest a better snare pattern on the "snare" channel and may upload that result back to the host composer device DAW 230*a* for consideration.

It is to be noted that the present disclosure describes operations of the server 110 that can be performed at the server 110, within DAWs 230*a-c*, or as a combination thereof. Moreover, the functionality described in plugins 240*a-c* for hosts and guests can be added to the DAWs 230*a-c*, themselves, giving users an easy way to toggle sharing on each channel.

In an embodiment, host composer device DAW 230*a* may transmit, to the server 110, a session termination request to terminate the session initiated during step 310 of process 300. The session termination request may be transmitted anytime between step 315 and step 360 of process 300 of FIG. 3. Upon the server 110 receiving the session termination request, the communication channel between the host composer device DAW 230*a* and the server 110 may be terminated by utilizing SIP protocols.

In an embodiment, any guest composer devices DAW 230*b-c* may transmit, to the server 110, a session termination request to terminate the session initiated during step 330 of process 300. Upon the server 110 receiving the session termination request, the communication channel between the guest composer devices DAW 230*b*-*c* that sent the termination request and the server 110 may be terminated by utilizing SIP protocols.

In an embodiment, host composer device DAW 230*a* may transmit, to the server 110, a session termination request to terminate the session of any of the guest composer devices DAW 230*b*-*c* initiated during step 330 of process 300. Upon the server 110 receiving the session termination request, the communication channel between the guest composer devices DAW 230*b*-*c* that the host composer device 230*a* has identified in the termination request and the server 110 may be terminated by utilizing SIP protocols.

System 100 may be implemented in a client-server system, database system, virtual desktop system, distributed computer system, cloud-based system, clustered database, data center, storage area network (SAN), or in any other suitable system, for example in a system designed for the provision of Software-as-a-Service (SaaS), such as a cloud data center or hosted web service.

The server 110 may be any server suitable for providing processing services to other applications, computers, clients, etc. A server engine may be a server engine that provides the core services for storing, processing and securing data in system 100, and may store data such as music pancakes and music files, along with any metadata associated therewith.

The storage areas and memory 128 may be implemented by any quantity of any type of other memory or storage device, and may be volatile (e.g., RAM, cache, flash, etc.), or non-volatile (e.g., ROM, hard-disk, optical storage, etc.), and include any suitable storage capacity. The storage areas may be, for example, one or more databases implemented on a solid state drive or in a RAM cloud. Data in the system (e.g., music pancakes, music files, audio files, etc.) are stored in the storage areas.

Processors 125 may be, for example, one or more data processing devices such as microprocessors, microcontrollers, systems on a chip (SOCs), or other fixed or programmable logic, that executes instructions for process logic stored the memory. The processors may themselves be multi-processors, and have multiple CPUs, multiple cores, multiple dies comprising multiple processors, etc.

Workstations 130 may be a computer system or device, such as a thin client, computer terminal, personal desktop computer, laptop or netbook, tablet, cellular phone, networked television, or other device capable of acting as a client.

Workstations 130 and the server 110 may be communicatively connected to each other, for example, via a network 150, which represent any hardware and/or software configured to communicate information via any suitable communications media (e.g., WAN, LAN, Internet, Intranet, wired, wireless, etc.), and may include routers, hubs, switches, gateways, or any other suitable components in any suitable form or arrangement. The various components of the system may include any other communications devices to communicate over the network via any other protocols, and may utilize any type of connection (e.g., wired, wireless, etc.) for access to the network.

System 100 may include additional servers, clients, and other devices not shown, and individual components of the system may occur either singly or in multiples, or for example, the functionality of various components may be combined into a single device or split among multiple devices. It is understood that any of the various components of the system may be local to one another, or may be remote from and in communication with one or more other components via any suitable means, for example a network such as a WAN, a LAN, Internet, Intranet, mobile wireless, etc.

DAWs 140 may provide an interface such as a graphical user interface (GUI) for a user of the client device to interact with the server 110.

Processors 125 may be, for example, a processing circuitry to perform operations of FIG. 3, FIG. 4, and FIGS. 8A-8D. Further, a data processing device that executes instructions for process logic stored in memory 128. Memory 128 may be implemented by any quantity of any type of or other memory or storage device, and may be volatile (e.g., RAM, cache, flash, etc.), or non-volatile (e.g., ROM, hard-disk, optical storage, etc.), and include any suitable storage capacity.

IO/communications components 122 may enable communication between a display device, input device(s), output device(s), and the other components of workstations 130, and may enable communication with these devices in any suitable fashion, e.g., via a wired or wireless connection. The display device may be any suitable display, screen or monitor capable of displaying information to a user of a workstation 130, for example the screen of a tablet or the monitor attached to a computer workstation. Input device(s) may include any suitable input device, for example, a keyboard, mouse, trackpad, touch input tablet, touch screen, camera, microphone, remote control, speech synthesizer, musical instrument or the like. Output device(s) may include any suitable output device, for example, a speaker, headphone, sound output port, or the like. The display device, input device(s) and output device(s) may be separate devices, e.g., a monitor used in conjunction with a microphone and speakers, or may be combined, e.g., a touchscreen that is a display and an input device, or a headset that is both an input (e.g., via the microphone) and output (e.g., via the speakers) device.

Components of the system 100 may each be implemented in the form of a processing system, or may be in the form of software. They can each be implemented by any quantity of or other computer systems or devices, such as a computing blade or blade server, thin client, computer terminal or workstation, personal computer, cellular phone or personal data assistant (PDA), or any other suitable device. A processing system may include any available operating system and any available software (e.g., browser software, communications software, word processing software, etc.). These systems may include processors, memories, internal or external communications devices (e.g., modem, network card, etc.), displays, and input devices (e.g., physical keyboard, touch screen, mouse, microphone for vocal input musical instruments, etc.). If embodied in software (e.g., as a virtual image), they may be available on a recordable medium (e.g., magnetic, optical, floppy, DVD, CD, other non-transitory medium, etc.) or in the form of a carrier wave or signal for downloading from a source via a communication medium (e.g., bulletin board, network, LAN, WAN, Intranet, Internet, mobile wireless, etc.).

Figure 9:
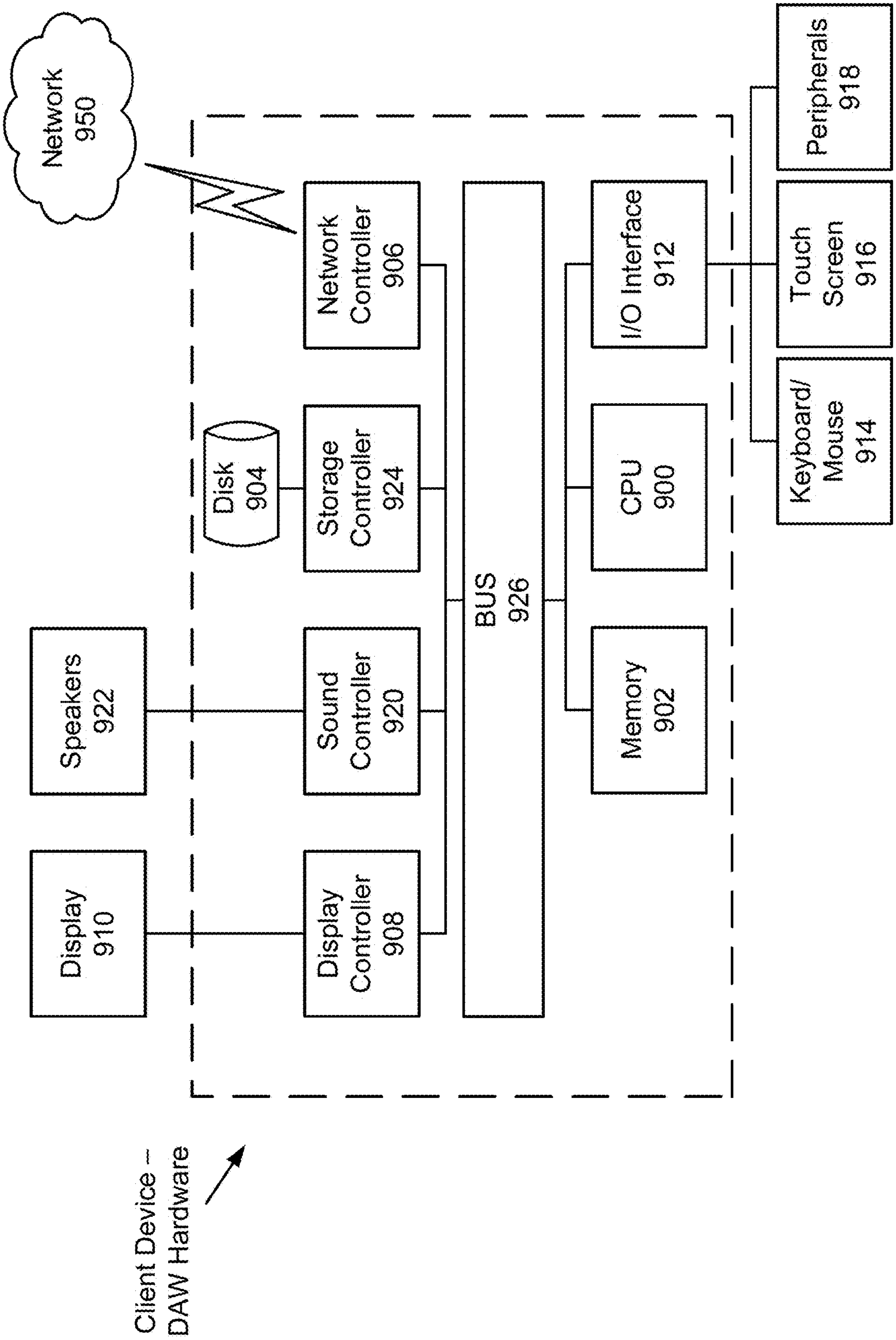
FIG. 9 is hardware schematic of a client device that may be utilized for the process of collaboration across multiple digital audio workstations, according to an exemplary embodiment of the present disclosure.

Next, a hardware description of a client device implementing a composer DAW is described according to exemplary embodiments with reference to FIG. 9. In FIG. 9, the client device includes a CPU 900 which performs the processes described above/below. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the client device communicates, such as a server or computer.

Further, the claimed advancements may be provided as a utility application, background daemon, or component of an operating system, or combination thereof, executing in conjunction with CPU 900 and an operating system such as Microsoft Windows 7, UNIX, Solaris, LINUX, Apple MAC-OS and other systems known to those skilled in the art.

The hardware elements in order to achieve the client device may be realized by various circuitry elements, known to those skilled in the art. For example, CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The client device in FIG. 9 also includes a network controller 906, such as an Intel Ethernet PRO network interface card from Intel Corporation of America, for interfacing with network 950. As can be appreciated, the network 950 can be a public network, such as the Internet, or a private network such as an LAN or WAN network, or any combination thereof and can also include PSTN or ISDN sub-networks. The network 950 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The client device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the client device, such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the client device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A system for collaborating on a musical composition over a communication network, the system comprising processing circuitry configured to obtain the musical composition stored within a data storage device of the system, the musical composition including a first musical input data associated with a first channel, receive, via the communication network, second musical input data from a client device, the second musical input data being associated with a second channel, generate a data block based on the received second musical input data, the generated data block including synchronization data associated with the second musical input data relative to at least a portion of the musical composition, and transmit the data block to memory, the memory being accessible via the communication network to the client device and other client devices that are collaborating on the musical composition.

(2) The system of (1), wherein the synchronization data include instructions based on a time stamp of the second musical input data relative to a timing of the musical composition.

(3) The system of either (1) or (2), wherein the processing circuitry is further configured to receive third musical input data from the client device, the third musical input data being associated with the first channel and corresponding to a portion of the first musical input data of the musical composition, determine whether a portion of the third musical input data is different from a segment of the corresponding portion of the first musical input data, generate, when it is determined the portion of the third musical input data is different form the segment of the corresponding portion of the first musical input data, a delta data block based on the portion of the third musical input data corresponding to the segment of the corresponding portion of the first musical input data, and transmit the delta data block to memory, the memory being accessible to the client device and other client devices that are collaborating on the musical composition.

(4) The system of any one of (1) to (3), wherein the processing circuitry is further configured to determine whether the portion of the third musical input data is different from the segment of the corresponding portion of the first musical input data by calculating a correlation between the portion of the third musical input data and the segment of the corresponding portion of the first musical input data, and determining, when the calculated correlation satisfies a threshold, whether the portion of the third musical input data comprises a period of time that exceeds a time threshold.

(5) The system of any one of (1) to (4), wherein the processing circuitry is further configured to receive, from the client device, instructions regarding the synchronization data, generate, a host data block based on the received instructions, the host data block including the synchronization data, and transmit the host data block to memory, the transmitted host data block being accessible to the other client devices.

(6) The system of any one of (1) to (5), wherein the synchronization data include instructions related to a tempo of the musical composition, the instructions dictating, to the other client devices, the tempo of the musical composition.

(7) The system of any one of (1) to (6), wherein each channel of the musical composition is associated with an instrument.

(8) The system of any one of (1) to (7), wherein the processing circuitry is further configured to receive, from a subsequent client device, a request to access the musical composition, and transmit, when it is determined the subsequent client device does not have permission to edit the musical composition, restricted composition data to the subsequent client device, the restricted composition data corresponding to a play-only version of the musical composition, the play-only version being structured for playback on the subsequent client device.

(9) The system according to any one of (1) to (8), wherein the data block includes the second musical input associated with the second channel and the processing circuitry is further configured to synchronize the first musical input data associated with the first channel and the second musical input data associated with the second channel based on the time stamp of the second musical input data relative to the timing of the musical composition included within the data block, the first musical input data associated with the first channel being previously synced with the timing of the musical composition.

(10) A method for collaborating on a musical composition over a communication network, comprising obtaining, by processing circuitry, the musical composition stored within a data storage device, the musical composition including a first musical input data associated with a first channel, receiving, by the processing circuitry and via the communication network, second musical input data from a client device, the second musical input data being associated with a second channel, generating, by the processing circuitry, a data block based on the received second musical input data, the generated data block including synchronization data associated with the second musical input data relative to at least a portion of the musical composition, and transmitting, by the processing circuitry, the data block to memory, the memory being accessible via the communication network to the client device and other client devices that are collaborating on the musical composition.

(11) The method of (10), wherein the synchronization data include instructions based on a time stamp of the second musical input data relative to a timing of the musical composition.

(12) The method of either of (10) or (11), further comprising receiving, by the processing circuitry, third musical input data from the client device, the third musical input data being associated with the first channel and corresponding to a portion of the first musical input data of the musical composition, determining, by the processing circuitry, whether a portion of the third musical input data is different from a segment of the corresponding portion of the first musical input data, generating, by the processing circuitry and when it is determined the portion of the third musical input data is different form the segment of the corresponding portion of the first musical input data, a delta data block based on the portion of the third musical input data corresponding to the segment of the corresponding portion of the first musical input data, and transmitting, by the processing circuitry, the delta data block to memory, the memory being accessible to the client device and other client devices that are collaborating on the musical composition.

(13) The method of any one of (10) to (12), wherein the determining whether the portion of the third musical input data is different from the segment of the corresponding portion of the first musical input data includes calculating, by the processing circuitry, a correlation between the portion of the third musical input data and the segment of the corresponding portion of the first musical input data, and determining, by the processing circuitry and when the calculated correlation satisfies a threshold, whether the portion of the third musical input data comprises a period of time that exceeds a time threshold.

(14) The method of any one of (10) to (13), further comprising receiving, by the processing circuitry and from the client device, instructions regarding the synchronization data, generating, by the processing circuitry, a host data block based on the received instructions, the host data block including the synchronization data, and transmitting, by the processing circuitry, the host data block to memory, the transmitted host data block being accessible to the other client devices.

(15) The method of any one of (10) to (14), wherein the synchronization data include instructions related to a tempo of the musical composition, the instructions dictating, to the other client devices, the tempo of the musical composition.

(16) The method of any one of (10) to (15), wherein each channel of the musical composition is associated with an instrument.

(17) The method of any one of (10) to (16), further comprising receiving, by the processing circuitry and from a subsequent client device, a request to access the musical composition, and transmitting, by the processing circuitry and when it is determined the subsequent client device does not have permission to edit the musical composition, restricted composition data to the subsequent client device, the restricted composition data corresponding to a play-only version of the musical composition, the play-only version being structured for playback on the subsequent client device.

(18) The system according to any one of (10) to (17), wherein the data block includes the second musical input associated with the second channel and the method further comprises synchronizing, by the processing circuitry, the first musical input data associated with the first channel and the second musical input data associated with the second channel based on the time stamp of the second musical input data relative to the timing of the musical composition included within the data block, the first musical input data associated with the first channel being previously synced with the timing of the musical composition.

(19) A non-transitory computer-readable storage medium including computer executable instructions wherein the instructions, when executed by a computer, cause the computer to perform a method for collaborating on a musical composition over a communications network, the method comprising obtaining the musical composition stored within a data storage device, the musical composition including a first musical input data associated with a first channel, receiving, via the communication network, second musical input data from a client device, the second musical input data being associated with a second channel, generating a data block based on the received second musical input data, the generated data block including synchronization data associated with the second musical input data relative to at least a portion of the musical composition, and transmitting the data block to memory, the memory being accessible via the communication network to the client device and other client devices that are collaborating on the musical composition.

(20) The non-transitory computer-readable storage medium of (19), wherein the synchronization data include instructions based on a time stamp of the second musical input data relative to a timing of the musical composition.

The apparatus, method, and computer readable medium discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

The methods, apparatuses, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus' refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for collaborating on a musical composition over a communication network, the musical composition including first musical input data associated with a first channel, the method comprising:

receiving, by processing circuitry, second musical input data from a client device, the second musical input data being associated with the first channel;

determining, by the processing circuitry, whether a portion of the second musical input data is different from a corresponding portion of the first musical input data; and upon determining the portion of the second musical input data is different from a corresponding portion of the first musical input data, generating, by the processing circuitry, difference data based on the portion of the second musical input data compared to the corresponding portion of the first musical input data, wherein the determining whether the portion of the second musical input data is different from the corresponding portion of the first musical input data includes calculating a correlation between the portion of the second musical input data and the corresponding portion of the first musical input data, and determining, when the calculated correlation satisfies a threshold, whether the portion of the second musical input data comprises a period of time that exceeds a time threshold.

2. The method of claim 1, further comprising generating, by the processing circuitry, synchronization data associated with the second musical input data relative to at least a portion of the musical composition.

3. The method of claim 2, wherein the synchronization data include instructions based on a time stamp of the second musical input data relative to a timing of the musical composition.

4. The method of claim 3, wherein the synchronization data includes the second musical input associated with a second channel and the method further comprises:

synchronizing the first musical input data associated with the first channel and the second musical input data associated with the second channel based on the time stamp of the second musical input data relative to the timing of the musical composition, the first musical input data associated with the first channel being previously synced with the timing of the musical composition.

5. The method of claim 2, further comprising:

transmitting the synchronization data and the difference data to a memory, the memory being accessible via the communication network to the client device and other client devices that are collaborating on the musical composition.

6. The method of claim 2, further comprising:

receiving, from the client device via the communication network, instructions regarding the synchronization data;

generating, by the processing circuitry, host composition data based on the received instructions, the host composition data including the synchronization data; and transmitting the host composition data to a memory, the transmitted host composition data being accessible to other client devices via the communication network.

7. The method of claim 6, wherein the synchronization data include instructions related to a tempo of the musical composition, the instructions dictating, to the other client devices via the communication network, the tempo of the musical composition.

8. The method of claim 1, wherein each the first channel of the musical composition is associated with an instrument.

9. The method of claim 1, further comprising:

receiving, from a subsequent client device via the communication network, a request to access the musical composition; and transmitting, when it is determined the subsequent client device does not have permission to edit the musical composition, restricted composition data to the subsequent client device via the communication network, the restricted composition data corresponding to a play-only version of the musical composition, the play-only version being structured for playback on the subsequent client device.

10. A non-transitory computer-readable storage medium including computer executable instructions wherein the instructions, when executed by processing circuitry, cause the processing circuitry to perform a method for collaborating on a musical composition over a communication network, the musical composition including first musical input data associated with a first channel, the method comprising:

receiving, by the processing circuitry, second musical input data from a client device, the second musical input data being associated with the first channel;

determining, by the processing circuitry, whether a portion of the second musical input data is different from a corresponding portion of the first musical input data; and upon determining the portion of the second musical input data is different from a corresponding portion of the first musical input data, generating, by the processing circuitry, difference data based on the portion of the second musical input data compared to the corresponding portion of the first musical input data, wherein the determining whether the portion of the second musical input data is different from the corresponding portion of the first musical input data includes calculating a correlation between the portion of the second musical input data and the corresponding portion of the first musical input data, and determining, when the calculated correlation satisfies a threshold, whether the portion of the second musical input data comprises a period of time that exceeds a time threshold.

11. The non-transitory computer-readable storage medium of claim 10, further comprising generating, by the processing circuitry, synchronization data associated with the second musical input data relative to at least a portion of the musical composition.

12. The non-transitory computer-readable storage medium of claim 11, wherein the synchronization data include instructions based on a time stamp of the second musical input data relative to a timing of the musical composition.

13. The non-transitory computer-readable storage medium of claim 11, further comprising:

transmitting the synchronization data and the difference data to a memory, the memory being accessible via the communication network to the client device and other client devices that are collaborating on the musical composition.

14. The non-transitory computer-readable storage medium of claim 11, further comprising:

receiving, from the client device via the communication network, instructions regarding the synchronization data;

generating, by the processing circuitry, host composition data based on the received instructions, the host composition data including the synchronization data; and transmitting the host composition data to a memory, the transmitted host composition data being accessible to other client devices via the communication network.

15. The non-transitory computer-readable storage medium of claim 10, further comprising:

receiving, from a subsequent client device via the communication network, a request to access the musical composition; and transmitting, when it is determined the subsequent client device does not have permission to edit the musical composition, restricted composition data to the subsequent client device via the communication network, the restricted composition data corresponding to a play-only version of the musical composition, the play-only version being structured for playback on the subsequent client device.

16. A system for collaborating on a musical composition over a communication network, the musical composition including first musical input data associated with a first channel, the system comprising:

processing circuitry configured to receive second musical input data from a client device, the second musical input data being associated with the first channel, determine whether a portion of the second musical input data is different from a corresponding portion of the first musical input data, and upon determining the portion of the second musical input data is different from a corresponding portion of the first musical input data, generate difference data based on the portion of the second musical input data compared to the corresponding portion of the first musical input data, wherein the processing circuitry is configured to determine whether the portion of the second musical input data is different from the corresponding portion of the first musical input data by calculating a correlation between the portion of the second musical input data and the corresponding portion of the first musical input data, and determining, when the calculated correlation satisfies a threshold, whether the portion of the second musical input data comprises a period of time that exceeds a time threshold.

17. The system of claim 16, wherein the processing circuitry is further configured to generate synchronization data associated with the second musical input data relative to at least a portion of the musical composition.

18. The system of claim 17, wherein the synchronization data include instructions based on a time stamp of the second musical input data relative to a timing of the musical composition.

19. The system of claim 17, wherein the processing circuitry is further configured to transmit the synchronization data and the difference data to a memory, the memory being accessible via the communication network to the client device and other client devices that are collaborating on the musical composition.

20. The system of claim 17, wherein the processing circuitry is further configured to receive, from the client device via the communication network, instructions regarding the synchronization data, generate host composition data based on the received instructions, the host composition data including the synchronization data, and transmit the host composition data to a memory, the transmitted host composition data being accessible to other client devices via the communication network.

* * * * *